(12) United States Patent
Nagai

(10) Patent No.: US 9,577,254 B2
(45) Date of Patent: Feb. 21, 2017

(54) LITHIUM-ION SECONDARY BATTERY

(71) Applicant: TOYOTA JIDOSHA KABUSHIKI KAISHA, Toyota-shi, Aichi (JP)

(72) Inventor: Hiroki Nagai, Toyota (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 100 days.

(21) Appl. No.: 14/362,660

(22) PCT Filed: Dec. 4, 2012

(86) PCT No.: PCT/JP2012/081310
§ 371 (c)(1),
(2) Date: Jun. 4, 2014

(87) PCT Pub. No.: WO2013/084851
PCT Pub. Date: Jun. 13, 2013

(65) Prior Publication Data
US 2014/0335417 A1    Nov. 13, 2014

(30) Foreign Application Priority Data
Dec. 5, 2011    (JP) .................................. 2011-266319

(51) Int. Cl.
*H01M 4/36*  (2006.01)
*H01M 4/131* (2010.01)
*H01M 4/525* (2010.01)
*H01M 4/505* (2010.01)
*C01G 53/00* (2006.01)
*H01M 4/485* (2010.01)
*H01M 10/04* (2006.01)
(Continued)

(52) U.S. Cl.
CPC .............. *H01M 4/366* (2013.01); *C01G 53/50* (2013.01); *H01M 4/131* (2013.01); *H01M 4/485* (2013.01);
(Continued)

(58) Field of Classification Search
None
See application file for complete search history.

(56) References Cited

U.S. PATENT DOCUMENTS

2008/0193834 A1    8/2008  Murakami et al.
2009/0155691 A1*   6/2009  Park ....................... B82Y 30/00
                                                    429/223
(Continued)

FOREIGN PATENT DOCUMENTS

CN    101242010    8/2008
JP    10-1316      1/1998
(Continued)

*Primary Examiner* — Patrick Ryan
*Assistant Examiner* — Wyatt McConnell
(74) *Attorney, Agent, or Firm* — Finnegan, Henderson, Farabow, Garrett & Dunner, LLP

(57) ABSTRACT

A lithium-ion secondary battery (100A) includes a positive electrode current collector (221A) and a positive electrode active material layer (223A) retained on the positive electrode current collector (221A). The positive electrode active material layer (223A) contains positive electrode active material particles, a conductive agent, and a binder. The positive electrode active material particles (610A) each include a shell portion (612) made of primary particles (800) of a layered lithium-transition metal oxide, a hollow portion (614) formed inside the shell portion (612), and a through-hole (616) penetrating through the shell portion (612). The primary particles (800) of the lithium-transition metal oxide have a major axis length of less than or equal to 0.8 μm in average of the positive electrode active material layer (223A).

13 Claims, 19 Drawing Sheets

(51) Int. Cl.
- *H01M 10/0587* (2010.01)
- *H01M 4/02* (2006.01)
- *H01M 10/0525* (2010.01)

(52) U.S. Cl.
CPC ............ H01M 4/505 (2013.01); H01M 4/525 (2013.01); *C01P 2002/10* (2013.01); *H01M 10/0431* (2013.01); *H01M 10/0525* (2013.01); *H01M 10/0587* (2013.01); *H01M 2004/021* (2013.01); *H01M 2220/20* (2013.01); *Y02E 60/122* (2013.01); *Y02P 70/54* (2015.11); *Y02T 10/7011* (2013.01)

(56) References Cited

U.S. PATENT DOCUMENTS

| | | |
|---|---|---|
| 2012/0248388 A1 | 10/2012 | Nagai et al. |
| 2012/0270107 A1 | 10/2012 | Toya et al. |
| 2012/0282525 A1 | 11/2012 | Nagai et al. |
| 2013/0108921 A1 | 5/2013 | Kase et al. |
| 2014/0050976 A1 | 2/2014 | Nagai |

FOREIGN PATENT DOCUMENTS

| | | |
|---|---|---|
| JP | 3032757 | 2/2000 |
| JP | 2004-253174 | 9/2004 |
| JP | 2006-134816 | 5/2006 |
| JP | 2009-259605 | 11/2009 |
| JP | 2011-116580 | 6/2011 |
| JP | 2011-119092 | 6/2011 |
| JP | 2011-228062 | 11/2011 |
| JP | 2011-233397 | 11/2011 |
| WO | WO 2011/074058 A1 | 6/2011 |
| WO | WO 2011/122448 A1 | 10/2011 |
| WO | WO 2012/153379 A1 | 11/2012 |

\* cited by examiner

LITHIUM-ION SECONDARY BATTERY

TECHNICAL FIELD

The present invention relates to lithium-ion secondary batteries.

In the present description herein, the term "secondary battery" refers to a repeatedly chargeable storage device in general, and it is a term that encompasses what is called storage batteries, such as lithium-ion secondary batteries, nickel-metal hydride batteries, and nickel-cadmium rechargeable batteries, as well as electrical storage elements such as electric double-layer capacitors.

In the present description, the term "lithium ion secondary battery" refers to a secondary battery in which lithium ions are used as electrolyte ions and charging and discharging are implemented by the transfer of electrons accompanying lithium ions between positive and negative electrodes. The battery commonly referred to as "lithium secondary battery" is a typical example encompassed by the lithium-ion secondary battery of the present description. The present application is a national phase application of International Application No. PCT/JP2012/081310, filed Dec. 4, 2012 and claims priority under the Paris Convention, or under laws and regulations in the designated countries, from Japanese Patent Application No. 2011-266319, filed on Dec. 5, 2011, the content of both of which is incorporated herein by reference.

BACKGROUND ART

Regarding a lithium-ion secondary battery, JP 2004-253174 A, for example, discloses the use of, as a positive electrode active material, a layered lithium-transition metal oxide comprising a hollow particle having an outer shell portion and a space portion inside the outer shell portion. The lithium-transition metal compound oxide proposed therein is such that, when it is cross-sectioned, the proportion of the area of the space portion with respect to the total of the areas of the outer shell portion and the space portion is greater than 0% but less than 20%. The publication states that the use of such a lithium-transition metal oxide for the positive electrode active material makes it possible to provide a non-aqueous electrolyte secondary battery that shows excellent battery performance even under more severe use environments.

The manufacturing method of the layered lithium-transition metal oxide is disclosed in paragraphs 0026 to 0042 of the publication. The manufacturing method disclosed therein roughly includes the following procedures. First, an aqueous solution containing cobalt ions and nickel ions in a predetermined composition ratio is dropped in pure water that is being agitated. Next, sodium hydroxide is dropped therein so that the pH will be 8 to 11, and cobalt and nickel are coprecipitated at a temperature of 40° C. to 80° C. at a number of revolution of 500 rpm to 1500 rpm, to obtain a coprecipitated substance. Next, the obtained coprecipitated substance is filtered, washed with water, and thereafter dried, and then mixed with lithium hydroxide. The mixture is then baked at a temperature of 650° C. to 1100° C. for 1 hour to 24 hours in an atmosphere in which the oxygen partial pressure is controlled, to synthesize a lithium-transition metal oxide.

JP 2011-119092 A discloses active material particles for a lithium secondary battery. The active material particles disclosed therein constitute a hollow structure having a secondary particle, in which a plurality of primary particles of a lithium-transition metal oxide are aggregated, and a hollow portion formed therein. It is also proposed that the secondary particle has a through-hole penetrating from the outside into the hollow portion, and that the BET specific surface area thereof is set to from 0.5 $m^2/g$ to 1.9 $m^2/g$. The publication states that such a hollow active material particle can achieve an improvement in high-rate performance, an improvement in durability, prevention of resistance increase, and an improvement in capacity retention ratio at the same time.

JP 3032757 B discloses the use of, as a positive electrode active material, a composite oxide represented by the general formula $Li_xM_{1-y}A_yF_zO_{2n-z}$, (where $0.9 \le x \le 1.1$, $0 \le y \le 0.5$, $0 \le z \le 0.25$, $1 \le n \le 2$, M is at least one transition element selected from the group consisting of Co, Ni, and Mn, and A is at least one element selected from the group consisting of Co, Ni, Mn, B, and Al), although it is unclear whether the positive electrode active material contains such a hollow particle as described above. The just-mentioned patent states that the positive electrode active material forms secondary particles each made of primary particles having a crystal structure with C-axis orientation tendency, and that the ratio ($D_{50}/r$) of the particle size $D_{50}$, at which the cumulative volume of the secondary particles reaches 50% in particle size distribution, to the average shorter axis length r of the primary particles is $10 \le (D_{50}/r) \le 50$. According to the patent, it provides a non-aqueous electrolyte secondary battery that shows high discharge voltage, excellent charge-discharge characteristics at high current, and excellent cycle performance.

CITATION LIST

Patent Literature

[Patent Literature 1] JP 2004-253174 A
[Patent Literature 2] JP 2011-119092 A
[Patent Literature 3] JP 3032757 B

SUMMARY OF INVENTION

Technical Problem

Lithium-ion secondary batteries have been increasingly used as the batteries for driving hybrid vehicles, which require high levels of output power characteristics at high rate and cycle performance, and moreover as the batteries for driving plug-in hybrid vehicles and electric vehicles, which require a particularly high level of capacity. The present inventor believes desirable that the lithium-ion secondary batteries used as such batteries can exhibit high power stably even at low charge levels. Herein, it is proposed to provide a lithium-ion secondary battery that makes use of the hollow active material particle as disclosed in JP 2011-119092 A as the positive electrode active material particle, and that can improve output power particularly at low charge levels (i.e., in a low SOC region).

Solution to Problem

A lithium-ion secondary battery according to one embodiment of the present invention comprises a current collector and a positive electrode active material layer retained on the current collector. The positive electrode active material layer includes positive electrode active material particles, a conductive agent, and a binder. The positive electrode active material particles each comprise a shell portion comprising primary particles of a layered lithium-transition metal oxide, a hollow portion formed inside the shell portion, and a through-hole penetrating through the shell portion. In addition, the primary particles of the lithium-transition metal oxide have a major axis length of less than or equal to 0.8 µm in average of the positive electrode active material layer. This lithium-ion secondary battery can improve the output power particularly at low charge levels.

The major axis length of the primary particles of the lithium-transition metal oxide may be equal to or greater than 0.2 µm. This ensures that the positive electrode active material particles have required strength. The through-hole may have an aperture width of from 0.01 µm to 2.0 µm in average of the positive electrode active material layer.

It is also possible that the proportion of the hollow portion may be equal to or greater than 23% of the apparent cross-sectional area of the positive electrode active material particle, in average of the positive electrode active material layer. It is also possible that, when the thickness of the shell portion at an arbitrary position within an inner surface of the shell portion is defined by the minimum distance from the arbitrary position within the inner surface of the shell portion to an outer surface of the shell portion in an arbitrary cross section of the positive electrode active material layer, the thickness of the shell portion may be less than or equal to 2.2 µm in average of the positive electrode active material layer. This makes it possible to suppress the diffusion resistance of lithium ions in the positive electrode more reliably, and to maintain high output power of the lithium-ion secondary battery at a low charge level and in a low temperature environment, for example. It is also possible that the thickness of the shell portion may be equal to or greater than 0.1 µm. This ensures that the lithium-ion secondary battery has required strength.

It is also possible that the lithium-transition metal oxide may contain at least nickel, cobalt, and manganese as its constituent elements. It is also possible that the lithium-transition metal oxide may additionally contain tungsten. It is also possible that the tungsten may be contained in the lithium-transition metal oxide in an amount of from 0.05 mol % to 2.0 mol % relative to the amount of the transition metals. This makes it possible to obtain the positive electrode active material particles in which the primary particles of the lithium-transition metal oxide have a major axis length of less than or equal to 0.8 µm more reliably.

It is preferable that the positive electrode active material particles be manufactured by, for example, a method comprising the steps of: mixing a lithium compound and a transition metal hydroxide containing at least one transition metal element constituting the lithium-transition metal oxide, to prepare an unsintered mixture; and sintering the mixture to obtain active material particles.

In this case, it is preferable that, for example, in the step of mixing, the unsintered mixture contain tungsten in an amount of from 0.05 mol % to 2.0 mol % relative to the amount of other transition metal(s). It is also preferable that, for example, in the step of producing a source hydroxide, an aqueous solution of a transition metal compound containing tungsten be produced, and a transition metal hydroxide containing tungsten be obtained in the form of particles of the transition metal hydroxide. In this case, it is also preferable that the transition metal hydroxide be allowed to contain tungsten in an amount of from 0.05 mol % to 2.0 mol % relative to the amount of other transition metal(s). Furthermore, it is also preferable that in the step of producing a source hydroxide, an aqueous solution $Aq_A$ containing at least one element of Ni, Co, and Mn be prepared, an aqueous solution $Aq_C$ containing tungsten be prepared separately, and the aqueous solution $Aq_A$ and the aqueous solution $Aq_C$ be mixed under an alkaline condition to produce an aqueous solution of a transition metal compound containing the tungsten. It is also preferable that the lithium compound be lithium carbonate. In addition, the step of sintering may preferably be performed, for example, at a sintering temperature of from 750° C. to 950° C. in an air atmosphere.

DESCRIPTION OF EMBODIMENTS

Here, an example of the structure of a lithium-ion secondary battery as a non-aqueous electrolyte secondary battery will be described first. Then, referring to the example of the structure as appropriate, a lithium-ion secondary battery according to one embodiment of the present invention will be described. The parts and components that exhibit the same workings are denoted by the same reference symbols as appropriate. The drawings are depicted schematically and do not necessarily reflect actual objects. The drawings merely show examples, and they do not limit the invention unless otherwise stated.

Figure 1:
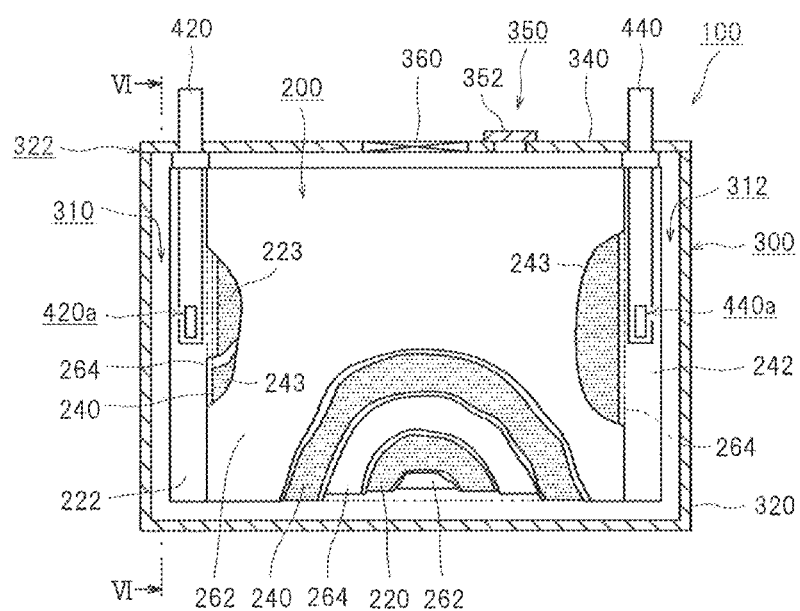
FIG. 1 is a view illustrating one example of the structure of a lithium-ion secondary battery.
Figure 2:
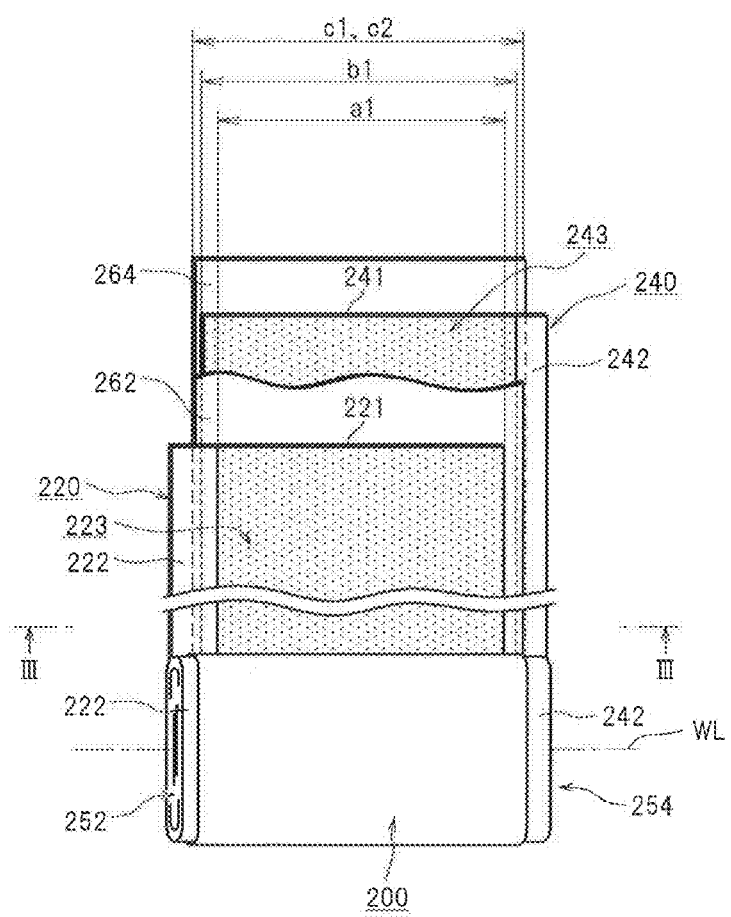
FIG. 2 is a view illustrating a wound electrode assembly of the lithium-ion secondary battery.
Figure 3:
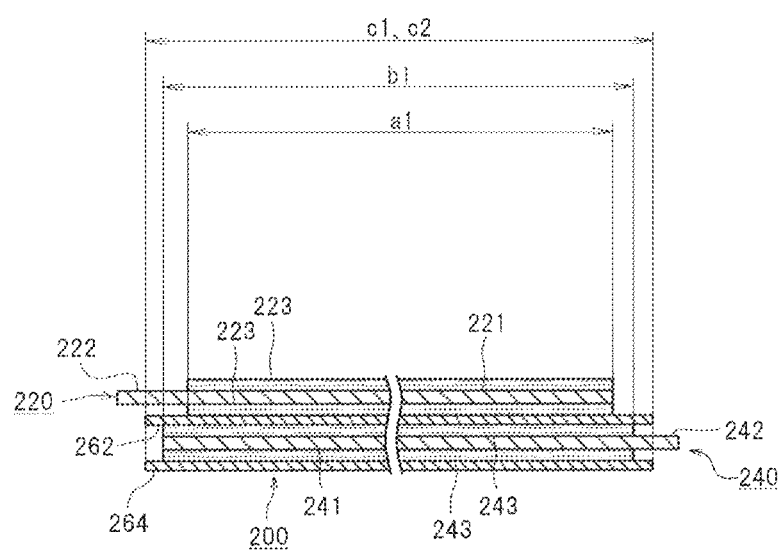
FIG. 3 shows a cross section taken along line III-III in FIG. 2.

FIG. 1 illustrates a lithium-ion secondary battery 100. As illustrated in FIG. 1, the lithium-ion secondary battery 100 has a wound electrode assembly 200 and a battery case 300. FIG. 2 is a view illustrating the wound electrode assembly 200. FIG. 3 shows a cross section taken along line III-III in FIG. 2.

As illustrated in FIG. 2, the wound electrode assembly 200 has a positive electrode sheet 220, a negative electrode sheet 240, and separators 262 and 264. The positive electrode sheet 220, the negative electrode sheet 240, and the separators 262 and 264 are strip-shaped sheets.

<<Positive Electrode Sheet 220>>

The positive electrode sheet 220 has a strip-shaped positive electrode current collector 221 and a positive electrode active material layer 223. A metal foil suitable for the positive electrode may be used preferably for the positive electrode current collector 221. For the positive electrode current collector 221, it is possible to use, for example, a strip-shaped aluminum foil having a predetermined width and a thickness of about 15 μm. In the example shown in the drawings, an uncoated portion 222 is provided along one lateral-side edge of the positive electrode current collector 221. As illustrated in FIG. 3, the positive electrode active material layer 223 is retained on both faces of the positive electrode current collector 221 except for the uncoated portion 222, which is provided in the positive electrode current collector 221. The positive electrode active material layer 223 contains a positive electrode active material. In this embodiment, the positive electrode mixture layer 223 is formed by coating a positive electrode mixture containing the positive electrode active material onto the positive electrode current collector 221.

<<Positive Electrode Active Material Layer 223>>

Figure 4:
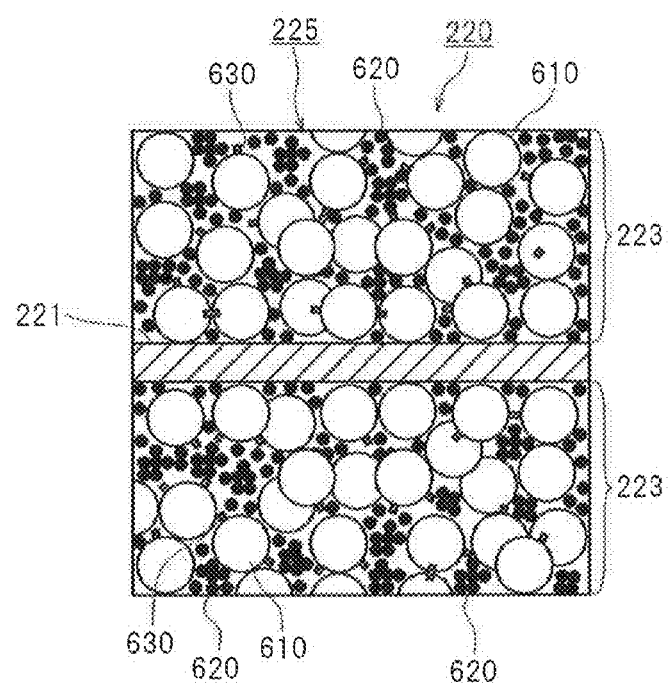
FIG. 4 is a cross-sectional view illustrating the structure of a positive electrode mixture layer.

Here, FIG. 4 is a cross-sectional view of the positive electrode sheet 220. In FIG. 4, positive electrode active material particles 610, conductive agent 620, and binder 630 in the positive electrode active material layer 223 are enlarged schematically so that the structure of the positive electrode active material layer 223 can be shown clearly. As illustrated in FIG. 4, the positive electrode active material layer 223 contains the positive electrode active material particles 610, the conductive agent 620, and the binder 630.

<<Positive Electrode Active Material Particles 610>>

Various types of substances that can be used as the positive electrode active material of lithium-ion secondary batteries may be used for the positive electrode active material particles 610. Examples of the substances for the positive electrode active material particles 610 include lithium-transition metal oxides, such as $LiNiCoMnO_2$ (lithium-nickel-cobalt-manganese composite oxide), $LiNiO_2$ (lithium nickel oxide), $LiCoO_2$ (lithium cobalt oxide), $LiMn_2O_4$ (lithium manganese oxide), and $LiFePO_4$ (lithium iron phosphate). Here, $LiMn_2O_4$ may have, for example, a spinel structure. $LiNiO_2$ and $LiCoO_2$ may have a layered rock-salt structure. $LiFePO_4$ may have, for example, an olivine structure. The $LiFePO_4$ with an olivine structure may include, for example, particles in the range of nanometers. The $LiFePO_4$ with an olivine structure may further be coated with a carbon film.

<<Conductive Agent 620>>

Examples of the conductive agent 620 include carbon materials, such as carbon powder and carbon fiber. As the conductive agent 620, it is possible to use one of the just-mentioned examples of the conductive agents either alone or in combination with another one or more of the examples. Examples of the carbon powder include various types of carbon blacks (such as acetylene black, oil-furnace black, graphitized carbon black, carbon black, graphite, and Ketjen Black) and graphite powder.

<<Binder 630>>

The binder 630 serves to bond the particles of the positive electrode active material particles 610 and the conductive agent 620 contained in the positive electrode active material layer 223 with each other, and to bond these particles with the positive electrode current collector 221. As the binder 630, it is possible to use polymers that can be dissolved or dispersed in the solvent used. For example, for the positive electrode mixture composition using an aqueous solvent, it is preferable to use water-soluble or water-dispersible polymers, including: cellulose-based polymers (such as carboxymethylcellulose (CMC) and hydroxypropyl methyl cellulose (HPMC)); fluoropolymers (such as polyvinyl alcohol (PVA), polytetrafluoroethylene (PTFE), and tetrafluoroethylene-hexafluoropropylene copolymer (FEP)); and rubber materials (such as vinyl acetate copolymer, styrene-butadiene copolymer (SBR), acrylic acid-modified SBR resin (SBR latex)). For the positive electrode mixture composition using a non-aqueous solvent, it is preferable to use polymers (such as polyvinylidene fluoride (PVDF), polyvinylidene chloride (PVDC), and polyacrylonitrile (PAN)).

<<Thickening Agent and Solvent>>

The positive electrode active material layer 223 is formed, for example, in the following manner: a positive electrode mixture is prepared by mixing the positive electrode active material particles 610 and the conductive agent 620 mentioned above into a paste form (slurry form) in a solvent, and the positive electrode mixture is then coated onto the positive electrode current collector 221, dried, and pressure-rolled. In this case, either an aqueous solvent or a non-aqueous solvent can be used as the solvent for the positive electrode mixture. A preferable example of the non-aqueous solvent is N-methyl-2-pyrrolidone (NMP). The above-mentioned examples of the polymer materials used as the binder 630 can also be used for the purpose of obtaining the function as an addition agent, such as a thickening agent for the positive electrode mixture, in addition to the function as the binder.

It is preferable that the mass ratio of the positive electrode active material in the entire positive electrode mixture be about 50 wt. % or more (typically from 50 wt. % to 95 wt. %), and generally more preferably from about 70 wt. % to about 95 wt. % (e.g., from 75 wt. % to 90 wt. %). The proportion of the conductive agent in the entire positive electrode mixture may be from about 2 wt. % to about 20 wt. %, and generally preferably from about 2 wt. % to about 15 wt. %. In a composition that uses a binder, the proportion of the binder in the entire positive electrode mixture may be from about 1 wt. % to about 10 wt. %, and generally preferably from about 2 wt. % to about 5 wt. %.

<<Negative Electrode Sheet 240>>

As illustrated in FIG. 2, the negative electrode sheet 240 has a strip-shaped negative electrode current collector 241 and a negative electrode active material layer 243. A metal foil suitable for the negative electrode may be used preferably for the negative electrode current collector 241. For the negative electrode current collector 241, it is possible to use, for example, a strip-shaped copper foil having a predetermined width and a thickness of about 10 μm. In the example shown in the drawings, an uncoated portion 242 is provided along one lateral-side edge of the negative electrode current collector 241. As illustrated in FIG. 3, the negative electrode active material layer 243 is retained on both faces of the negative electrode current collector 241 except for the uncoated portion 242, which is provided in the negative electrode current collector 241. The negative electrode active material layer 243 contains at least a negative electrode active material. In this embodiment, the negative electrode active material layer 243 is formed by coating a negative electrode mixture containing the negative electrode active material onto the negative electrode current collector 241.

<<Negative Electrode Active Material Layer 243>>

Figure 5:
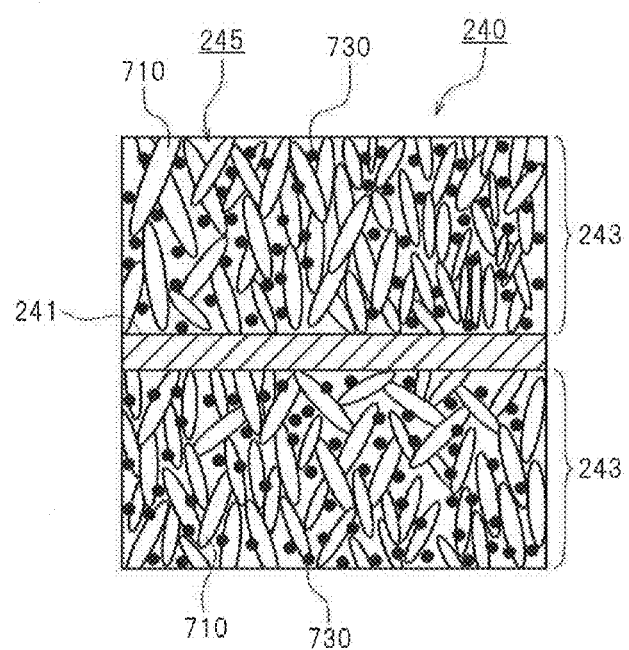
FIG. 5 is a cross-sectional view illustrating the structure of a negative electrode mixture layer.

FIG. 5 is a cross-sectional view of the negative electrode sheet 240. As illustrated in FIG. 5, the negative electrode active material layer 243 contains negative electrode active material particles 710, a thickening agent (not shown), a binder 730, and so forth. In FIG. 5, the negative active material particles 710 and the binder 730 in the negative electrode active material layer 243 are enlarged schematically so that the structure of the negative electrode active material layer 243 can be shown clearly.

<<Negative Electrode Active Material Particles 710>>

As the negative electrode active material particles 710, it is possible to use any conventional material used for lithium-ion secondary batteries, either alone or in combination, without any particular limitation. Examples of the negative electrode active material particles 710 include particulate carbon materials (carbon particles) at least partially containing a graphite structure (a layered structure). The negative electrode active material particles 710 may be, for example, natural graphite, natural graphite coated with amorphous carbon material, graphitic materials (graphites), non-graphitizable carbons (hard carbons), graphitizable carbons (soft carbons), and combinations thereof. Here, the figure depicts a case in which what is called flake graphite is used as the negative electrode active material particle 710, but the negative electrode active material particle 710 is not limited to the example shown in the figure.

Other possible examples of the negative electrode active material include metallic compounds (preferably metal oxides) containing metal elements such as Si, Ge, Sn, Pb, Al, Ga, In, As, Sb, and Bi. It is also possible to use LTO (lithium titanium oxide) as the negative electrode active material particles. For the negative electrode active material comprising a metallic compound, it is also possible that the surface of the metallic compound may be coated sufficiently with, for example, a carbon film to form a particulate material with good electrical conductivity. In this case, it is possible that the negative electrode active material layer contains no conductive agent, or that the content of the conductive agent may be lowered relative to the conventional negative electrode active material layer. Such additional features of the negative electrode active material and forms thereof, such as particle size, may be selected as appropriate according to the required characteristics.

<<Thickening Agent and Solvent>>

The negative electrode active material layer 243 is formed, for example, in the following manner a negative electrode mixture is prepared by mixing the negative electrode active material particles 710 and the binder 730 mentioned above into a paste form (slurry form) in a solvent, and the negative electrode mixture is then coated onto the negative electrode current collector 241, dried, and pressure-rolled. In this case, either an aqueous solvent or a non-aqueous solvent can be used as the solvent for the negative electrode mixture. A preferable example of the non-aqueous solvent is N-methyl-2-pyrrolidone (NMP). For the binder 730, any of the polymer materials shown as the examples of the binder 630 of the above-described positive electrode active material layer 223 (see FIG. 4) may be used. The previously-mentioned examples of the polymer materials used as the binder 630 of the positive electrode active material layer 223 can also be used as an addition agent for the purpose of obtaining necessary functions other than the function as the binder, for example, as a thickening agent for the positive electrode mixture or the negative electrode mixture.

<<Separators 262 and 264>>

Each of the separators 262 and 264 is a member for separating the positive electrode sheet 220 and the negative electrode sheet 240 from each other, as illustrated in FIGS. 1 and 2. In this example, each of the separators 262 and 264 is made of a strip-shaped sheet having a plurality of micropores and having a predetermined width. For the separators 262 and 264, it is possible to use, for example, a single layer separator or a multi-layered separator, which is made of porous polyolefin-based resin. In this example, as illustrated in FIGS. 2 and 3, the width b1 of the negative electrode active material layer 243 is slightly wider than the width a1 of the positive electrode active material layer 223. In addition, the width c1, c2 of the separators 262 and 264 is slightly wider than the width b1 of the negative electrode active material layer 243 (c1, c2>b1>a1).

In the example shown in FIGS. 1 and 2, each of the separators 262 and 264 is made of a sheet-shaped member. Each of the separators 262 and 264 should be a member that insulates the positive electrode sheet 223 and the negative electrode sheet 243 from each other and at the same time permits transfer of electrolyte. Therefore, the separators are not limited to sheet-shaped members. In place of the sheet-shaped member, each of the separators 262 and 264 may be made of, for example, a layer of insulative particles that are formed on a surface of the positive electrode active material layer 223 or the negative electrode active material layer 243. The insulative particles may be made of an insulative inorganic filler (for example, a filler of metal oxide or metal hydroxide) or insulative resin particles (for example, particles of polyethylene or polypropylene).

In this wound electrode assembly 200, as illustrated in FIGS. 2 and 3, the positive electrode sheet 220 and the negative electrode sheet 240 are stacked with the separators 262 and 264 interposed therebetween, so that the positive electrode sheet 220 and the negative electrode sheet 240 face each other. More specifically, the positive electrode sheet 220, the negative electrode sheet 240, and the separators 262 and 264 are stacked in the wound electrode assembly 200 in the following order: the positive electrode sheet 220, the separator 262, the negative electrode sheet 240, and the separator 264.

In this case, the positive electrode active material layer 223 and the negative electrode active material layer 243 face each other while the separators 262 and 264 are interposed therebetween. The portion of the positive electrode current collector 221 on which the positive electrode active material layer 223 is not formed (i.e., the uncoated portion 222) protrudes from one side end of the region where the positive electrode active material layer 223 and the negative electrode active material layer 243 face each other. The portion of the negative electrode current collector 241 on which the negative electrode active material layer 243 is not formed (i.e., the uncoated portion 242) protrudes from the opposite end to the side end from which the uncoated portion 222 protrudes.

<<Battery Case 300>>

In this example, as illustrated in FIG. 1, the battery case 300 is what is called a prismatic battery case, and it includes a case main body 320 and a lid 340. The case main body 320 has a closed-bottom quadrangular prismatic tubular shape, and is a flat-box-shaped case and whose one side face (upper face) is open. The lid 340 is a member that is attached to the opening of the case main body 320 (the opening in the upper face thereof) to close the opening.

For a secondary battery used for a vehicle, it is desired to improve the weight energy efficiency (the capacity of the battery per unit weight) in order to improve the fuel consumption of the vehicle. In this embodiment, a lightweight metal such as aluminum or an aluminum alloy (aluminum in this example) is employed for the case main body 320 and the lid 340, which constitute the battery case 300. This enables to improve the weight energy efficiency.

The battery case 300 has a flat rectangular internal space as the space for accommodating the wound electrode assembly 200. As illustrated in FIG. 1, the width of the flat internal space of the battery case 300 is slightly wider than the width of the wound electrode assembly 200. In this embodiment, the battery case 300 has the case main body in a closed-bottom quadrangular prismatic tubular shape and the lid 340 closing the opening of the case main body 340. To the lid 340 of the battery case 300, electrode terminals 420 and 440 are attached. The electrode terminals 420 and 440 penetrate through the battery case 300 (the lid 340) and stick out outside the battery case 300. The lid 340 is provided with a filling port 350 and a safety vent 360.

Figure 6:
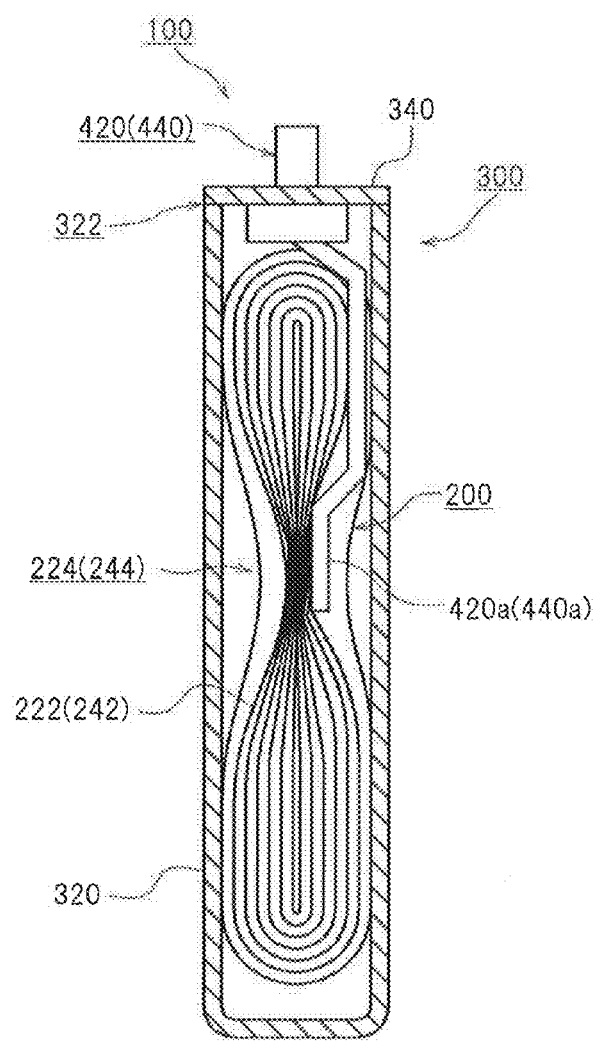
FIG. 6 is a side view illustrating a portion where an uncoated portion of the wound electrode assembly is welded to an electrode terminal.

As illustrated in FIG. 2, the wound electrode assembly 200 is pressed and deformed into a flat shape in one direction orthogonal to the winding axis WL. In the example shown in FIG. 2, the uncoated portion 222 of the positive electrode current collector 221 and the uncoated portion 242 of the negative electrode current collector 241 are exposed from the respective sides of the separators 262 and 264 in a spiral shape. As illustrated in FIG. 6, in this embodiment, the intermediate portions 224 and 244 of the uncoated portions 222 and 242 are gathered and welded to the foremost end portions 420a and 440a of the respective electrode terminals 420 and 440. In this case, from the viewpoint of the difference in the materials of the positive electrode current collector 221 and the negative electrode current collector 241, ultrasonic welding, for example, is used for welding the electrode terminal 420 to the positive electrode current collector 221. On the other hand, resistance welding, for example, is used for welding the electrode terminal 440 to the negative electrode current collector 241. Here, FIG. 6 is a side view illustrating the portion where the intermediate portion 224 (244) of the uncoated portion 222 (242) of the wound electrode assembly 200 is welded to the electrode terminal 420 (440), and it is also a cross-sectional view taken along line VI-VI in FIG. 1.

The wound electrode assembly 200 is attached to the electrode terminals 420 and 440 fixed to the lid 340 while it is pressed into a flat shape. As illustrated in FIG. 1, the wound electrode assembly 200 is accommodated in the flat internal space of the case main body 320. The case main body 320 is closed by the lid 340 after the wound electrode assembly 200 is placed therein. A joint portion 322 (see FIG. 1) between the lid 340 and the case main body 320 is welded and sealed by, for example, laser welding. Thus, in this example, the wound electrode assembly 200 is positioned in the battery case 300 by the electrode terminals 420 and 440 fixed to the lid 340 (i.e., the battery case 300).

<<Electrolyte Solution>>

Thereafter, an electrolyte solution is filled into the battery case 300 through the filling port 350 provided in the lid 340. What is called a non-aqueous electrolyte solution, which does not use water as the solvent, is used as the electrolyte solution. For example, the electrolyte solution may be an electrolyte solution in which $LiPF_6$ is contained at a concentration of about 1 mol/L in a mixed solvent of ethylene carbonate and diethyl carbonate (e.g., a mixed solvent with a volume ratio of about 1:1). After the electrolyte solution is filled, the battery case 300 is sealed by attaching (for example, by welding) a metal sealing cap 352 to the filling port 350. It should be noted that the electrolyte solution is not limited to the examples of the electrolyte solution described herein. For example, any non-aqueous electrolyte solution that has conventionally been used for lithium-ion secondary batteries may be used as appropriate.

<<Pore>>

Here, the positive electrode active material layer 223 has tiny gaps 225, which may be called voids, for example, between the positive electrode active material particles 610 and the particles of the conductive agent 620 (see FIG. 4). The tiny gaps in the positive electrode active material layer 223 can be impregnated with the electrolyte solution (not shown). Also, the negative electrode active material layer 243 has tiny gaps 245, which may be called voids, for example, between the particles of the negative electrode active material particles 710 (see FIG. 5). Herein, such gaps (or voids) 225 and 245 are referred to as "pores" as appropriate. In addition, in the wound electrode assembly 200, the uncoated portions 222 and 242 are wound in a spiral form at the respective sides along the winding axis WL, as illustrated in FIG. 2. The electrolyte solution can infiltrate through the gaps in the uncoated portions 222 and 242 at the respective sides 252 and 254 along the winding axis WL. Thus, in the lithium-ion secondary battery 100, the electrolyte solution is impregnated throughout the positive electrode active material layer 223 and the negative electrode active material layer 243.

<<Gas Release Passage>>

In this example, the flat internal space of the battery case 300 is slightly wider than the wound electrode assembly 200 deformed in a flat shape. Gaps 310 and 312 are provided between the wound electrode assembly 200 and the battery case 300 at the respective sides of the wound electrode assembly 200. Each of the gaps 310 and 312 serves as a gas release passage. For example, when the temperature of the lithium-ion secondary battery 100 abnormally rises such as in the case of overcharging, it is possible that the electrolyte solution may be decomposed and gas may be generated abnormally. In this embodiment, the abnormally generated gas can move toward the safety vent 360 through the gaps 310 and 312 between the wound electrode assembly 200 and the battery case 300, and is discharged out of the battery case 300 from the safety vent 360.

In the lithium-ion secondary battery 100, the positive electrode current collector 221 and the negative electrode current collector 241 of the wound electrode assembly 200 are electrically connected to an external device via the electrode terminals 420 and 440 penetrating through the battery case 300. The operation of the lithium-ion secondary battery 100 during charge and during discharge will be described in the following.

<<Operation During Charge>>

Figure 7:
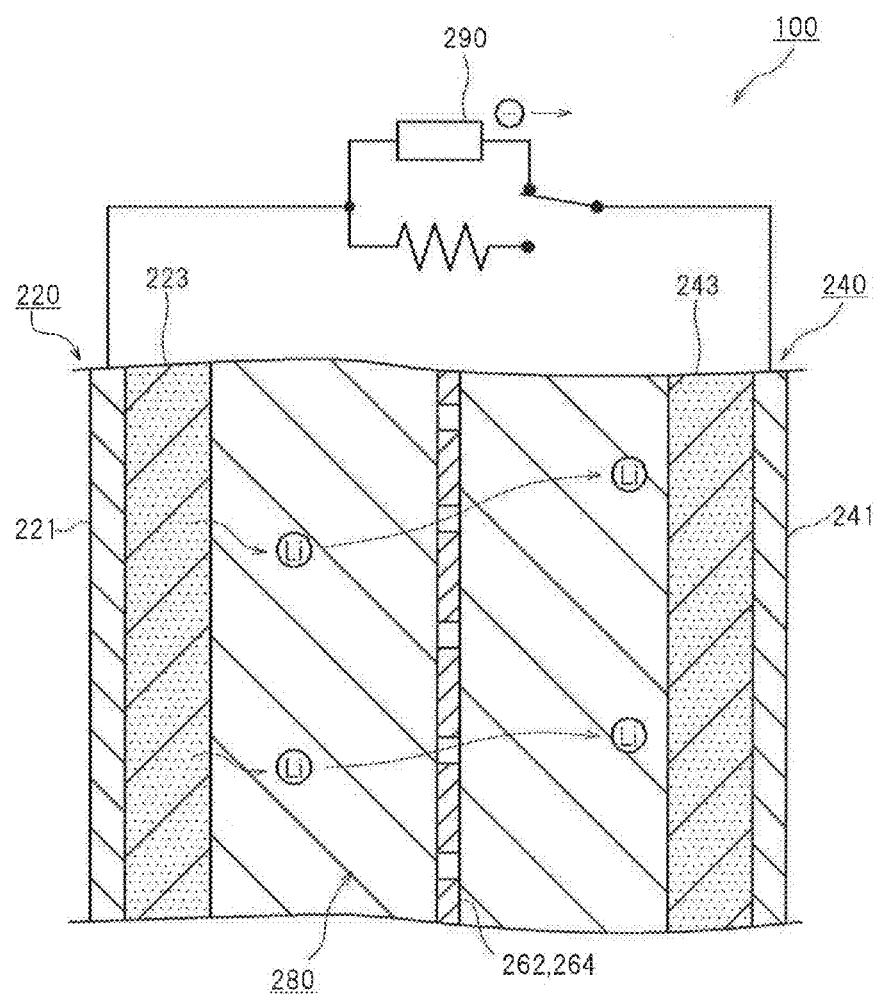
FIG. 7 is a view schematically illustrating a state during charge of the lithium-ion secondary battery.

FIG. 7 schematically illustrates the state of the lithium-ion secondary battery 100 during charge. During charge, the electrode terminals 420 and 440 (see FIG. 1) of the lithium-ion secondary battery 100 are connected to a charger 290, as illustrated in FIG. 7. By the working of the charger 290, lithium ions (Li) are released into the electrolyte solution 280 from the positive electrode active material in the positive electrode active material layer 223 during charge. In addition, electric charge is released from the positive electrode active material layer 223. The released electric charge is transferred through the conductive agent (not shown) to the positive electrode current collector 221 and further transferred through the charger 290 to the negative electrode sheet 240. In the negative electrode sheet 240, electric charge is stored, and also the lithium ions (Li) in the electrolyte solution 280 are absorbed and stored in the negative electrode active material within the negative electrode active material layer 243.

<<Operation During Discharge>>

Figure 8:
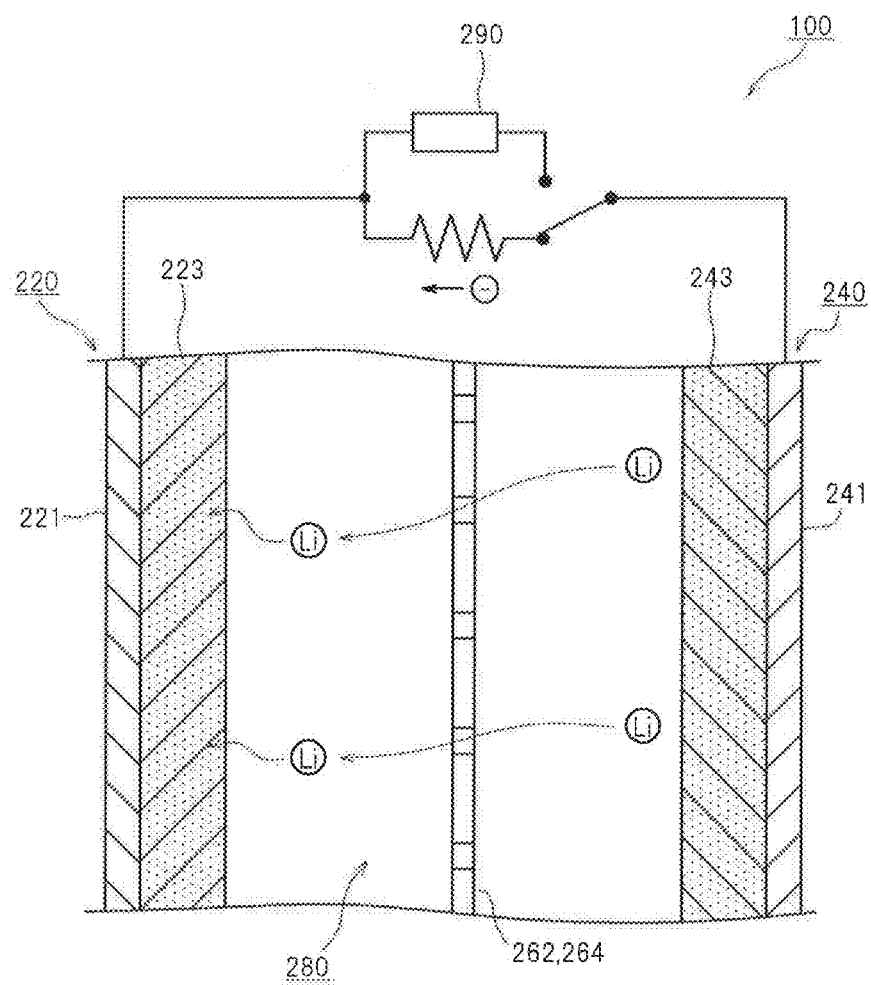
FIG. 8 is a view schematically illustrating a state during discharge of the lithium-ion secondary battery.

FIG. 8 schematically illustrates the state of the lithium-ion secondary battery 100 during discharge. During discharge, as illustrated in FIG. 8, electric charge is transferred from the negative electrode sheet 240 to the positive electrode sheet 220, and at the same time, the lithium ions stored in the negative electrode active material layer 243 are released into the electrolyte solution 280. In the positive electrode, the lithium ions in the electrolyte solution 280 are absorbed into the positive electrode active material within the positive electrode active material layer 223.

Thus, in the charge and discharge of the lithium-ion secondary battery 100, lithium ions are transferred back and forth between the positive electrode active material layer 223 and the negative electrode active material layer 243 via the electrolyte solution 280. In addition, during charge, electric charge is transferred from the positive electrode active material through the conductive agent to the positive electrode current collector 221. On the other hand, during discharge, electric charge is returned from the positive electrode current collector 221 through the conductive agent to the positive electrode active material.

In the case of charge, when the transfer of lithium ions and the transfer of electrons take place more smoothly, it is believed possible to achieve more efficient and rapid charging. In the case of discharge, when the transfer of lithium ions and the transfer of electrons take place more smoothly, the resistance in the battery becomes lower and the amount of discharge becomes higher, so it is believed possible to improve the output power of the battery.

<<Other Battery Constructions>>

It should be noted that the foregoing merely shows one example of the lithium-ion secondary battery. The lithium-ion secondary battery is not limited to the foregoing embodiments. In addition, the electrode sheet in which an electrode mixture is coated on a metal foil may be used in various other types of battery constructions. For example, cylindrical batteries and laminate-type batteries are known as other types of battery constructions. The cylindrical battery is a battery in which a wound electrode assembly is enclosed in a cylindrical battery case. The laminate-type battery is a battery in which positive electrode sheets and negative electrode sheets are stacked on each other with separators interposed therebetween.

Hereinbelow, a lithium-ion secondary battery according to one embodiment of the present invention will be described. Herein, the same components and portions having the same functions as those of the above-described lithium-ion secondary battery 100 are denoted by the same reference signs, and the drawings of the above-described lithium-ion secondary battery 100 are referenced as necessary. It is also noted that the components and portions of a lithium-ion secondary battery 100A according to one embodiment of the present invention are denoted by adding the letter "A" to the corresponding reference signs as appropriate. In the present invention, the lithium-transition metal oxide used as the positive electrode active material is mainly designed.

Figure 9:
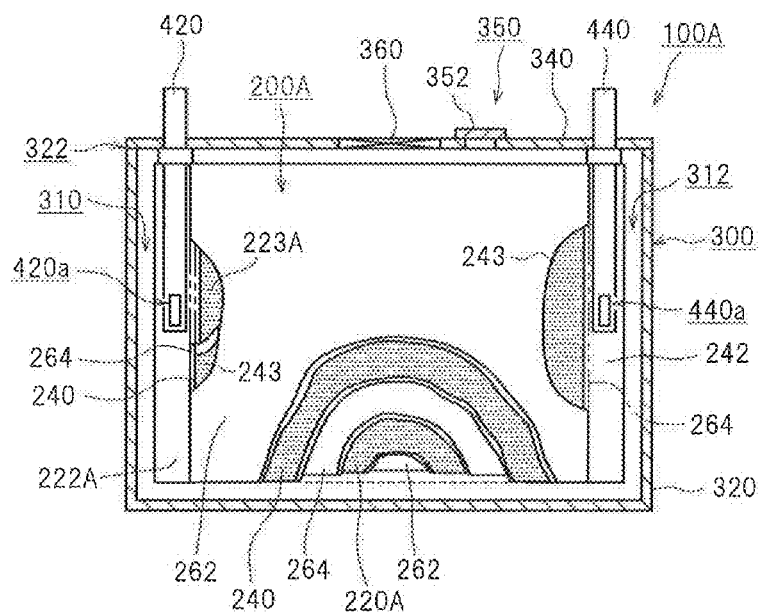
FIG. 9 is a view illustrating a lithium-ion secondary battery according to one embodiment of the present invention.
Figure 10:
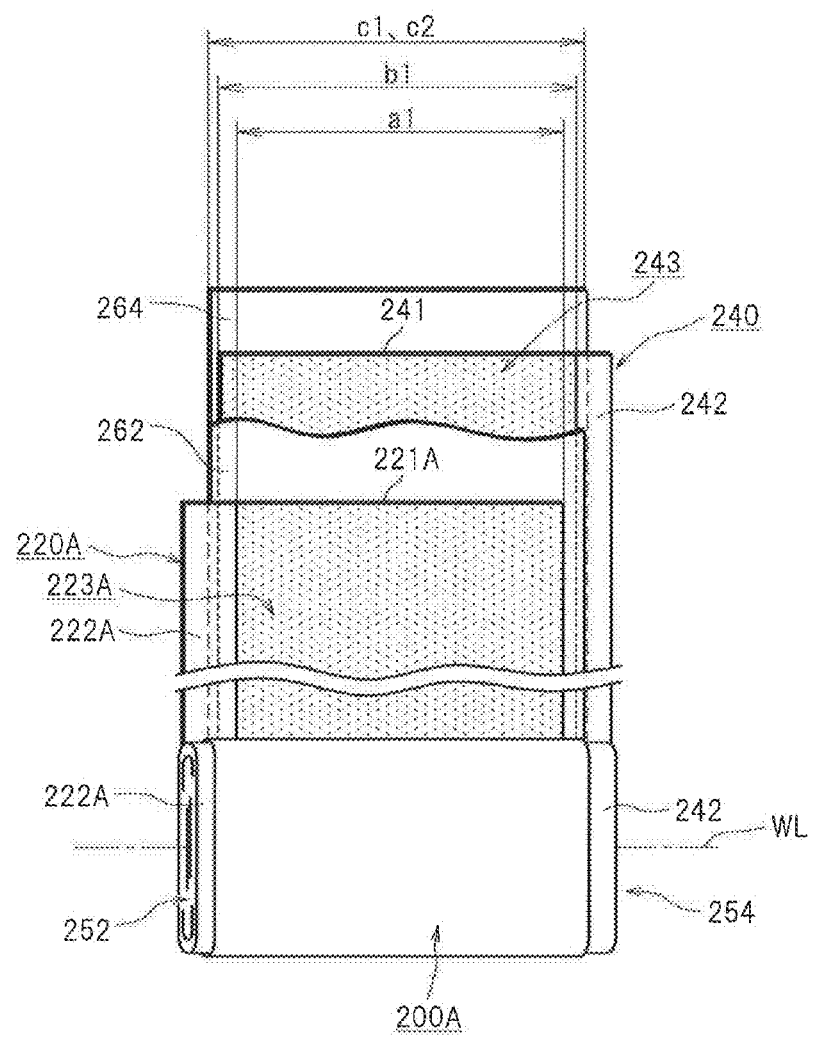
FIG. 10 is a view illustrating a wound electrode assembly of a lithium-ion secondary battery according to one embodiment of the present invention.
Figure 11:
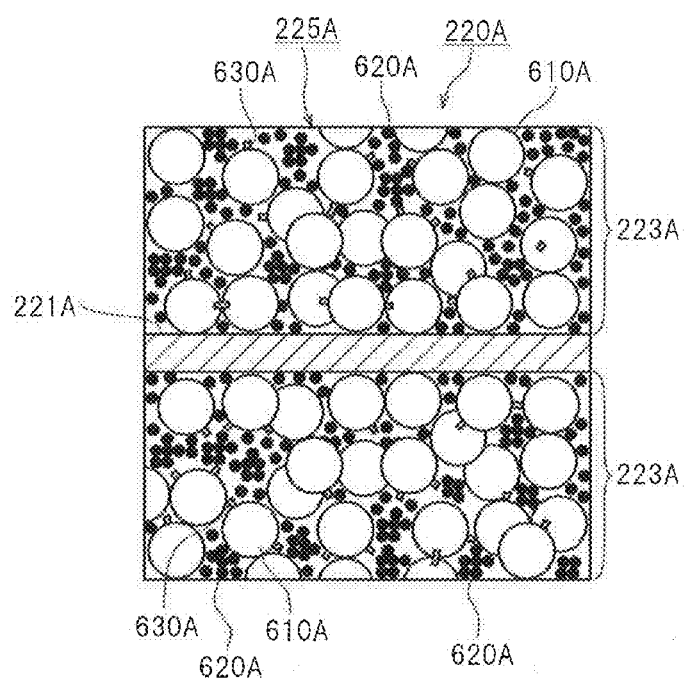
FIG. 11 is a view illustrating the structure of a positive electrode active material layer of the lithium-ion secondary battery.
Figure 12A:
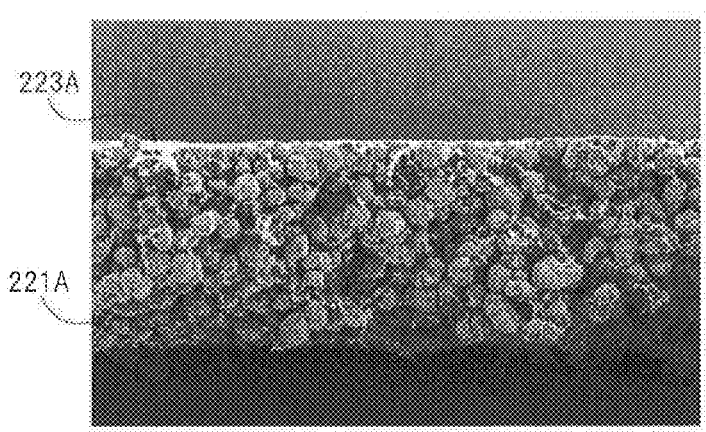
FIG. 12A is an electron micrograph of positive electrode active material particles in the positive electrode active material layer.
Figure 12B:
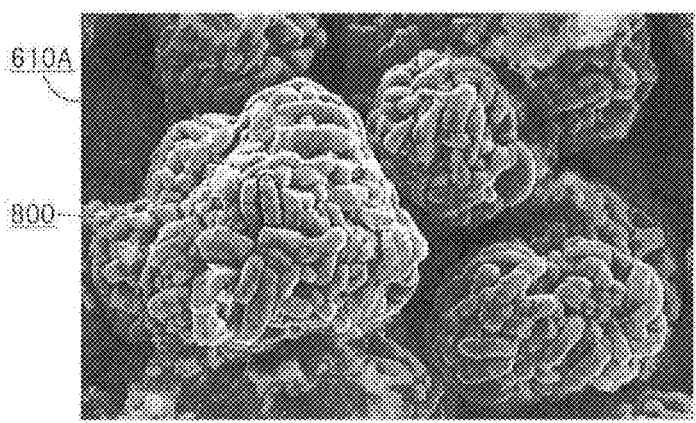
FIG. 12B is an electron micrograph of positive electrode active material particles in the positive electrode active material layer.
Figure 13:
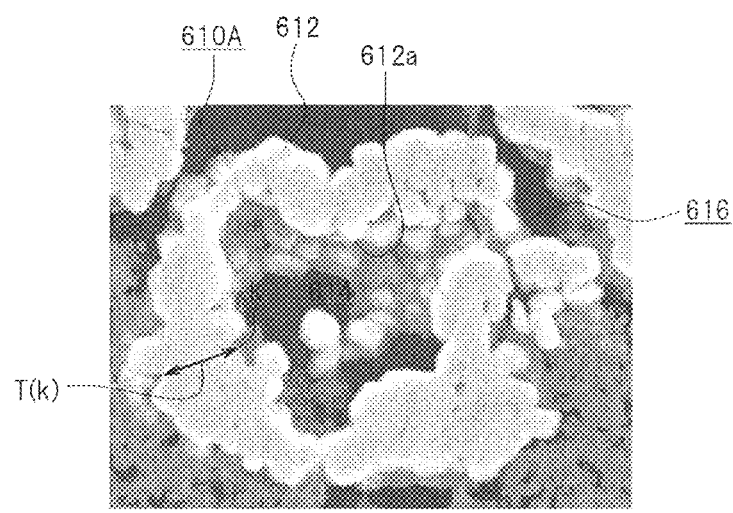
FIG. 13 is a cross-sectional SEM image of a positive electrode active material particle (secondary particle) in the positive electrode active material layer.
Figure 14:
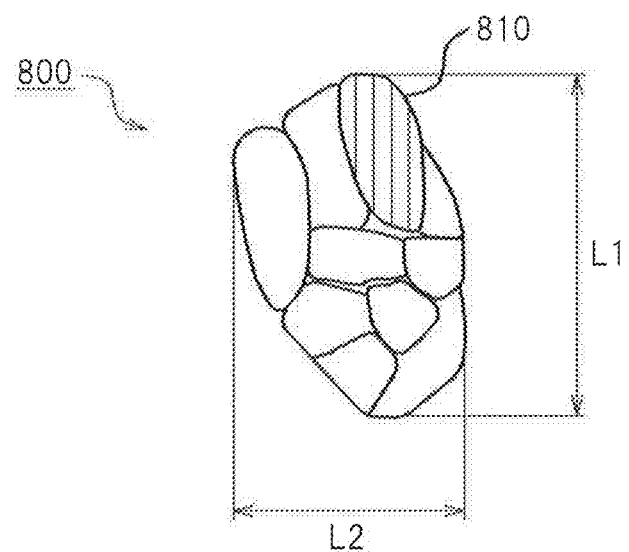
FIG. 14 is a schematic view illustrating a primary particle of the positive electrode active material particle.
Figure 15:
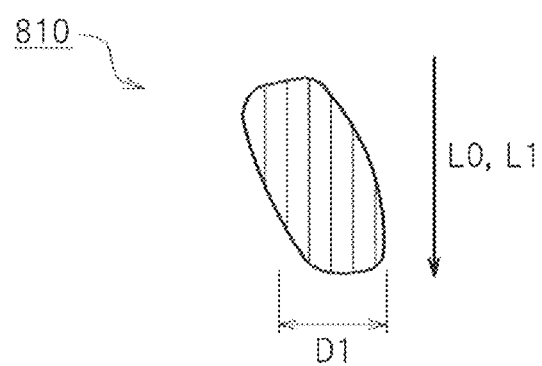
FIG. 15 is a schematic view illustrating a crystallite of the positive electrode active material particle.

FIG. 9 is a view illustrating the lithium-ion secondary battery 100A according to one embodiment of the present invention. FIG. 10 is a view illustrating a wound electrode assembly 200A of the lithium-ion secondary battery 100A according to one embodiment of the present invention. FIG. 11 is a view illustrating the structure of a positive electrode active material layer 223A of the lithium-ion secondary battery 100A. FIGS. 12A and 12B are electron micrographs of positive electrode active material particles 610A in the positive electrode active material layer 223A. FIG. 13 is a cross-sectional SEM image of a positive electrode active material particle 610A (secondary particle) in the positive electrode active material layer 223A. FIG. 14 is a schematic view illustrating a primary particle 800 of the positive electrode active material particle 610A. FIG. 15 is a schematic view illustrating a crystallite of the positive electrode active material particle 610A.

As illustrated in FIGS. 9 and 10, the lithium-ion secondary battery 100A has a positive electrode current collector 221A and a positive electrode active material layer 223A retained on the positive electrode current collector 221A. As illustrated in FIG. 11, the positive electrode active material layer 223A contains positive electrode active material particles 610A, a conductive agent 620A, and a binder 630A. As illustrated in FIGS. 12A, 12B, and 13, for example, the positive electrode active material particles 610A each comprise a shell portion 612 comprising primary particles 800 of a layered lithium-transition metal oxide, a hollow portion 614 formed inside the shell portion 612, and a through-hole (or through-holes) 616 penetrating through the shell portion 612. In addition, as illustrated in FIG. 14, the major axis length L1 of the primary particles 800 of the lithium-transition metal oxide is less than or equal to 0.8 μm.

In this lithium-ion secondary battery 100A, the positive electrode active material particles 610 each comprise the shell portion 612, the hollow portion 614, and the through-hole(s) 616, and the major axis length L1 of the primary particles 800 of the lithium-transition metal oxide is less than or equal to 0.8 μm, as described above. The present inventor discovered that the use of such positive electrode active material particles 610A can improve the output power especially in a low SOC region. Hereinbelow, such a lithium-ion secondary battery 100A will be described in more detail.

<<Positive Electrode Active Material Particles 610>>

As illustrated in FIGS. 12A and 12B, the positive electrode active material particles 610A each comprise the shell portion 612 comprising primary particles of a layered lithium-transition metal oxide, the hollow portion 614 formed inside the shell portion 612, and the through-hole(s) 616 penetrating through the shell portion 612. It should be noted that, in this description, the inner surface 612a of the shell portion 612 does not include the portion(s) thereof that corresponds to the through-hole(s) 616 of the positive electrode active material particle 610. In addition, the hollow portion 614 of the positive electrode active material particle 610 does not include the through-hole(s) 616. The structure of the positive electrode active material particle 610 that has the shell portion 612, the hollow portion 614, and the through-hole(s) 616 in this way is herein referred to as "perforated hollow structure" as appropriate. In this lithium-ion secondary battery 100A, the major axis length of the primary particles of the lithium-transition metal oxide is less than or equal to 0.8 μm in average of the positive electrode active material layer 223A.

<<Primary Particles of Lithium-Transition Metal Oxide>>

Herein, the primary particle 800 of the lithium-transition metal oxide is such a particulate form as follows. When the positive electrode active material particles 610A are secondary particles, the primary particles 800 form the positive electrode active material particles 610A as such secondary particles, and each primary particle 800 can be considered as an ultimate particle when judged from its apparent geometric form. Each of the primary particles 800 is further an aggregate of crystallites of the lithium-transition metal oxide.

FIG. 12A is a cross-sectional SEM image showing a cross section of the positive electrode active material layer 223A that is split by bending it. FIG. 12B is an enlarged image of the positive electrode active material particles 610A in the SEM image of the just-mentioned cross section. The primary particles 800 can be observed from a SEM image of a cross section obtained by bending and splitting the positive electrode active material layer 223A, for example, as illustrated in FIGS. 12A and 12B. The primary particles 800 may also be observed from an electron micrograph of the positive electrode active material particles 610A, a SEM image of particle surfaces of the positive electrode active material particles 610A, or the like. The SEM images of the split cross section of the positive electrode active material layer 223A, the electron micrographs of the positive electrode active material particles 610A, the SEM images of particle surfaces of the positive electrode active material particles 610A, or the like can be obtained by, for example, a Hitachi ultra-high resolution field emission scanning electron microscope S-5500.

<<Major Axis Length L1 of Primary Particles 800>>

The major axis length L1 of the primary particles 800 can be determined based on the positive electrode active material particles 610A observed from a SEM image of a cross section obtained by bending and splitting the positive electrode active material layer 223A, for example, as illustrated in FIG. 12B. The major axis length L1 may also be determined based on an electron micrograph of the positive electrode active material particles 610A or a SEM image of particle surfaces of the positive electrode active material particles 610A. In determining the major axis length L1 of the primary particles 800 based on a SEM image of particle surfaces of the positive electrode active material particles 610A, as illustrated in FIG. 12B, it is desirable to identify primary particles 800 that are suitable for identifying the major axis length L1 of the primary particles 800 from the SEM image of the particle surfaces of secondary particles, the positive electrode active material particles 610A. More specifically, in the SEM image of the particle surfaces of the positive electrode active material particles 610A, which are the secondary particles, a plurality of primary particles 800 are photographed. These primary particles 800 should be ordered in order of area, and a plurality of primary particles 800 having large areas should be extracted. This makes it possible to extract primary particles 800 whose outer shape along substantially the longest major axis length L1 are photographed from the SEM image of the particle surfaces. Then, as illustrated in FIG. 14, the length of the longest major axis is determined in the extracted primary particles 800, and the determined length is employed as the major axis length L1 of the primary particles 800. Also, the length of the minor axis that is the shortest axis orthogonal to the major axis is employed as the minor axis length L2 of the primary particles 800.

Herein, when the major axis length L1 and the minor axis length L2 of the primary particles 800 are mentioned regarding the positive electrode active material particles 610A, they are evaluated by the arithmetic mean thereof in a plurality of primary particles 800 contained in a single positive electrode active material particle 610A. For the positive electrode active material layer 223A, they are evaluated by the arithmetic mean thereof in a plurality of positive electrode active material particles 610A contained in the positive electrode active material layer 223A.

<<Crystallite>>

In addition, as illustrated in FIG. 14, each of the primary particles 800 is an aggregate of crystallites 810 of the lithium-transition metal oxide. Herein, the crystallite of the lithium-transition metal oxide means the largest collective unit that can be regarded as a single crystal of the lithium-transition metal oxide. In this embodiment, the crystallite 810 of the lithium-transition metal oxide has a layered structure (layered rock-salt structure), as illustrated in FIG. 15, and it is believed that lithium ions move along the interlayer spaces within the positive electrode active material particles 610A during charge and discharge. As illustrated in FIG. 15, the layers in the crystallite 810 are stacked along the 003 plane orientation determined from an X-ray diffraction analysis using CuKα radiation.

<<Crystallite Size>>

Here, the present inventor measured the crystallite size of the positive electrode active material particles 610A along the 003 plane orientation determined from an X-ray diffraction analysis using CuKα radiation. Herein, the crystallite size D1 is obtained by the following equation.

$$D1 = (0.9 \times \lambda)/(\beta \times \cos\theta),$$

where D1, λ, β, and θ represent the following, respectively:
D1: crystallite size
λ: wavelength of X ray (CuKα) [Å]
β: diffraction peak width originating from the crystallite [rad]
θ: Bragg angle of diffraction Here, each of the positive electrode active material particles 610A has 003 crystallites the 003 plane orientation determined from an X-ray diffraction analysis using CuKα radiation. Accordingly, the half width β of 17.9° to 19.9° is applied to the above equation as the Bragg angle of diffraction.

Figure 16:
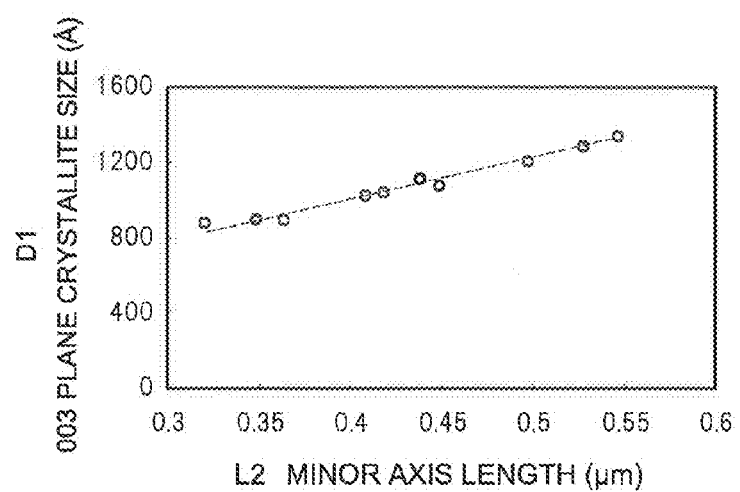
FIG. 16 illustrates the relationship between the minor axis length (µm) of primary particles and the 003 plane crystallite size (Å) of the lithium-transition metal oxide in the positive electrode active material particles.

The present inventor discovered that the crystallite size (Å) of the positive electrode active material particles 610A determined in the above-described manner and the minor axis length L2 (μm) of the primary particles 800 correlate well each other. FIG. 16 illustrates the relationship between the minor axis length L2 (μm) of the primary particles 800 and the 003 plane crystallite size D1 (Å) of the lithium-transition metal oxide in the positive electrode active material particles 610A. The plots "○" in FIG. 16 represent the minor axis length L2 of the primary particles 800 and the 003 plane crystallite size D1 (Å) in a single positive electrode active material particle 610A. In FIG. 16, the horizontal axis represents the minor axis length L2 and the vertical axis represents the 003 plane crystallite size D1 (Å). As indicated in FIG. 16, the longer the minor axis length L2 of the primary particles 800 is, the longer the 003 plane crystallite size D1 (Å) accordingly, so the relationship therebetween is approximately a linear correlation.

Here, the major axis length L1 of the primary particles 800 in the positive electrode active material particle 610A is the length of the primary particles 800 along one orientation orthogonal to the orientation of the minor axis length L2, as illustrated in FIG. 14. Accordingly, the present inventor believes that the major axis length L1 of the primary particles 800 can approximately correlate with the crystallite size along the orientation orthogonal to the orientation of the 003 plane crystallite size D1 (Å).

Here, the orientation of the 003 plane crystallite size D1 (Å) relates to the orientation of the normal of the layers of the lithium-transition metal oxide, as illustrated in FIG. 15. The orientation orthogonal to the orientation of the 003 plane crystallite size D1 (Å) is orthogonal to the orientation of the just-mentioned normal, and it indicates one orientation along the interlayer spaces of the layered lithium-transition metal oxide. It is believed that lithium ions move along the interlayer spaces in the layered lithium-transition metal oxide. Accordingly, it is believed that the orientation orthogonal to the orientation of the 003 plane crystallite size D1 (Å) correlates one orientation L0 in which lithium ions generally diffuse, and the major axis length L1 of the primary particles 800.

Figure 17:
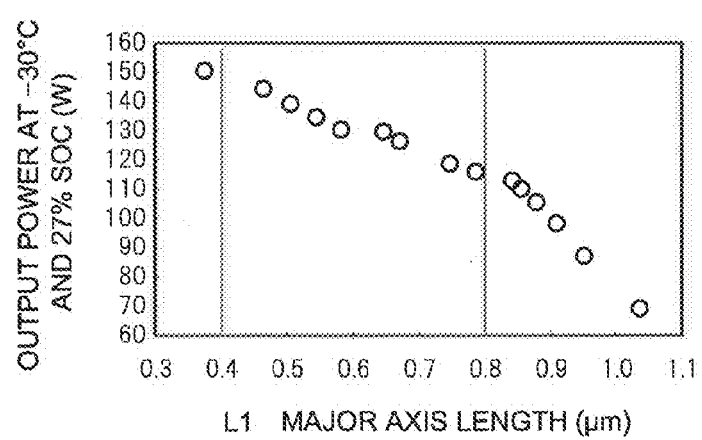
FIG. 17 illustrates the relationship between the major axis length of primary particles of the lithium-transition metal oxide in the positive electrode active material particles and the output power characteristics at a low charge level.

The present inventor studied the relationship between the major axis length L1 of the primary particles 800 of the positive electrode active material particles 610A and the output power characteristics of the lithium-ion secondary battery 100A that was produced using the positive electrode active material particles 610A at a low charge level. FIG. 17 illustrates the relationship between the major axis length L1 and the output power characteristics at a low charge level. Herein, the "output power characteristics in a charged state at −30° C. and at a SOC of 27%" were evaluated as the output power characteristics of the lithium-ion secondary battery 100A at a low charge level. As illustrated in FIG. 17, when the major axis length L1 of the positive electrode active material particles 610A is smaller, the lithium-ion secondary battery 100A tends to show better output power characteristics at a low charge level. According to the knowledge of the present inventor, it is desirable that the major axis length L1 of the positive electrode active material particles 610A be less than or equal to about 0.8 μm, more preferably less than or equal to 0.75 μm.

Herein, as illustrated in FIGS. 9 to 11, the positive electrode active material particles 610A are contained in the positive electrode active material layer 223A of the wound electrode assembly 200A of the lithium-ion secondary battery 100A. The positive electrode active material layer 223A is formed by coating the positive electrode mixture containing the positive electrode active material particles 610A, the binder, and so forth onto the positive electrode current collector 221A, drying the mixture, and pressure-rolling the resultant article. In such an embodiment, the physical properties of the paste may be adversely affected when preparing the positive electrode active material layer 223A if the major axis length L1 of the positive electrode active material particles 610A is too small, according to the knowledge of the present inventor. In addition, such an adverse effect may occur that cracks can develop in the active material at the time of the pressing process. Taking these issues into account, it is desirable that the major axis length L1 of the positive electrode active material particles 610A used for the positive electrode active material layer 223A be about equal to or greater than 0.2 μm, more preferably equal to or greater than 0.4 μm.

In addition, a layered lithium-transition metal oxide is used as the positive electrode active material particles 610A, and they have a perforated hollow structure, as mentioned previously.

Furthermore, the present inventor studied the relationship with the particle void fraction for the positive electrode active material particles 610A having such a perforated hollow structure. Herein, the term "particle void fraction" refers to the proportion of the hollow portions 614 in the positive electrode active material particles 610A. As a result, it was found that the particle void fraction should desirably be equal to or greater than 23%.

In addition, the present inventor studied the relationship with the thickness of the shell portion 612 for the positive electrode active material particles 610A having such a perforated hollow structure. Herein, the thickness of the shell portion 612 at an arbitrary position K in the inner surface of the shell portion 612 is defined by the minimum distance T(k) from an arbitrary position k to an outer surface of the shell portion 612 in an arbitrary cross section of the positive electrode active material layer 223A. As a result, it was found desirable that in this lithium-ion secondary battery 100A, the thickness T of the shell portion 612 be less than or equal to 2.2 μm in average in an arbitrary cross section of the positive electrode active material layer 223A.

<<Proportion of Hollow Portion 614: Particle Void Fraction>>

Herein, the proportion of the hollow portions 614 in the positive electrode active material particles 610A can be determined, for example, based on a cross-sectional SEM image of the positive electrode active material layer 223A. As for the cross-sectional SEM image of the positive electrode active material layer 223A, the shell portion 612, the hollow portion 614, and the through-hole 616 of the positive electrode active material particle 610A can be distinguished from each other by difference in color tone or contrast in the cross-sectional SEM image of the positive electrode active material layer 223A, as illustrated in FIG. 13.

Based on an arbitrary cross-sectional SEM image of the positive electrode active material layer 223A, the ratio (A/B) of the area A occupied by the hollow portion 614A of the positive electrode active material particle 610A to the apparent cross-sectional area B occupied by the positive electrode active material particle 610A in the cross-sectional SEM image is obtained. Here, the apparent cross-sectional area B occupied by the positive electrode active material particle 610A is the cross-sectional area occupied by the shell portion 612, the hollow portion 614 and the through-hole(s) 616 of the positive electrode active material particle 610A.

Furthermore, for a plurality of arbitrary cross-sectional SEM images of the positive electrode active material layer 223A, the mean value of the above-described ratios (A/B) is obtained. The greater the number of the cross-sectional SEM images for obtaining the area ratio (A/B) in such a cross-sectional SEM image, the more the mean value of the ratios (A/B) in the positive electrode active material layer 223A converges. The proportion of the area occupied by the hollow portions 614 in the apparent cross-sectional area of the positive electrode active material particles 610A in average of the positive electrode active material layer 223A can be approximately obtained by the mean value of the ratios (A/B). The proportion of the cross-sectional area occupied by the hollow portions 614 in the apparent cross-sectional area of the positive electrode active material particles 610A in average of the positive electrode active material layer 223A is referred to as "particle void fraction" as appropriate.

<<Thickness T of Shell Portion 612>>

In this case, the minimum distance T(k) is obtained for a plurality of positions in the inner surface 612a of the shell portion 612. Then, it is desirable to calculate the mean value of the minimum distances T(k) for the plurality of positions in the inner surface 612a of the shell portion 612. In this case, the greater the number of the positions at which the minimum distance T(k) is obtained in the inner surface 612a of the shell portion 612, the more the thickness T of the shell portion 612 converges to the mean value, which reflects the thickness of the shell portion 612 more accurately. With this method, the thickness of the shell portion 612 is determined uniquely for an arbitrary position k in the inner surface 612a of the shell portion 612. As a result, even when the cross-sectional shape of the shell portion 612 is irregular, the thickness T of the shell portion 612 can be generally defined uniquely over the whole of the positive electrode active material particles 610A.

As illustrated in FIG. 13, the positive electrode active material particles 610A each comprise the shell portion 612, the hollow portion 614, and the through-hole(s) 616, and the inside of the shell portion 612 (i.e., the hollow portion 614) and the outside of the shell portion 612 communicate with each other through the through-hole(s) 616. Such a positive electrode active material particle 610 is referred to as a perforated hollow structure as appropriate. The positive electrode active material particle 610A is such that, for example, the proportion of the hollow portion 614 is equal to or greater than 23% of the apparent cross-sectional area of the positive electrode active material particle 610A, which means that it has a wide hollow portion 614. Moreover, the positive electrode active material particle 610A has the through-hole(s) 616 penetrating through the shell portion 612. Therefore, the electrolyte solution 280 (see FIGS. 7 and 8) also enters the inside of the shell portion 612 (i.e., the hollow portion 614) through the through-holes 616. In this positive electrode active material particle 610A, the hollow portion 614 is wide. As a result, the electrolyte solution 280 containing lithium ions sufficiently exists not only in the outside part of the shell portion 612 but also in the inside of the shell portion 612 (i.e., the hollow portion 614). Moreover, in this lithium-ion secondary battery 100A, the thickness T of the shell portion 612 of the positive electrode active material particle 610A is thin, less than or equal to 2.2 µm in average in an arbitrary cross section of the positive electrode active material layer 223A.

According to the knowledge of the present inventor, the thinner the thickness T of the shell portion 612 of the positive electrode active material particle 610A is, the more easily the lithium ions are released from the inside of the shell portion 612 of the positive electrode active material particle 610A during charge, and the more easily the lithium ions are absorbed into the inside of the shell portion 612 of the positive electrode active material particle 610A during discharge.

This lithium-ion secondary battery 100A is such that the major axis length L1 of the primary particles 800 of the positive electrode active material particles 610A is less than or equal to 0.8 µm in average of the positive electrode active material layer 223A. When the major axis length L1 of the primary particles 800 of the positive electrode active material particles 610A is less than or equal to 0.8 µm in this way, the distance in the direction in which lithium ions diffuse is short in the primary particles 800 of the positive electrode active material particles 610A. Therefore, it is believed that the positive electrode active material particles 610A have good lithium ion diffusion capability.

In addition, it is preferable that the proportion of the hollow portions 614 in the positive electrode active material particles 610A be equal to or greater than 23%, and the positive electrode active material particles 610A have the through-holes 616 penetrating through the shell portion 612, and moreover, the thickness T of the shell portion 612 of the positive electrode active material particles 610A be very thin (less than or equal to 2.2 µm herein). Such positive electrode active material particles 610A enable lithium ions to diffuse into the inner portion of the shell portion 612 (i.e., the inside of the active material) more quickly.

When this is the case, lithium ions are released easily from the inside of the shell portion 612 of the positive electrode active material particle 610A during charge, and lithium ions are absorbed easily into the inside of the shell portion 612 of the positive electrode active material particle 610A during discharge. Thus, the positive electrode active material particles 610A are such that the major axis length L1 of the primary particles 800 is short, they show good lithium ion diffusion capability, and moreover, the thickness of the shell portion 612 is thin. This contributes to smooth lithium ion release from and absorption into the inside of the shell portion 612 and moreover the primary particles 800 during charge and discharge of the lithium-ion secondary battery 100A. This enables to increase the amount of the lithium ions that are released and absorbed per unit weight of the positive electrode active material particles 610A and also to reduce the resistance at the time when the positive electrode active material particles 610A release and absorb lithium ions.

Generally, the lithium-ion secondary battery tends to show a decrease in the output power when the charge level is low (for example, when the SOC is less than or equal to 30%). However, this lithium-ion secondary battery 100A can maintain required output power even at a low charge level because the lithium ion diffusion capability in the positive electrode active material particles 610A is high even when the charge level is low.

The positive electrode active material particles 610A each comprise the shell portion 612, the hollow portion 614, and the through-hole(s) 616, as described above. The major axis length L1 of the primary particles 800 is less than or equal to 0.8 µm. More preferably, the hollow portion 614 is wide, and the shell portion 612 is thin. The positive electrode active material particles 610A of this type have not been commonly known in the past. For example, the proportion of the hollow portion 614 is equal to or greater than 23% of the apparent cross-sectional area of the positive electrode active material particle 610A, which means that such positive electrode active material particles 610A are clearly distinguished from mere sintered materials.

<<Manufacturing Method of Positive Electrode Active Material Particles 610>>

The following describes a suitable method of manufacturing the positive electrode active material particles 610A that can obtain such positive electrode active material particles 610A stably.

The method of manufacturing the positive electrode active material particles 610A includes, for example, a source hydroxide producing step, a mixing step, and a sintering step. The source hydroxide producing step is a step of supplying ammonium ions to an aqueous solution of a transition metal compound to precipitate particles of the transition metal hydroxide from the aqueous solution. Here, the aqueous solution contains at least one transition metal element that constitutes the lithium-transition metal oxide.

Herein, it is desirable that the source hydroxide producing step include a nucleation stage of precipitating a transition metal hydroxide from the aqueous solution and a particle growth stage of growing the transition metal hydroxide in a condition in which the pH of the aqueous solution is lower than that at the nucleation stage.

The mixing step is a step of mixing a lithium compound and the transition metal hydroxide to prepare an unsintered mixture. The sintering step is a step of sintering the mixture to obtain the positive electrode active material particles 610A. More preferably, it is desirable to pulverize the sintered material after the sintering and to sieve and classify the material.

Hereinbelow, the method of manufacturing the positive electrode active material particles 610A will be described in more detail.

The perforated hollow active material particles disclosed herein can be manufactured by, for example, the method including precipitating a hydroxide of at least one transition metal element contained in the lithium-transition metal oxide that constitutes the active material particles (preferably all the metal elements contained in the lithium-transition metal oxide other than lithium) from an aqueous solution containing the transition metal element(s) under an appropriate condition, then mixing the transition metal hydroxide with a lithium compound, and sintering the mixture. Hereinbelow, one embodiment of the method of manufacturing the active material particles will be described in detail, taking a case of manufacturing perforated hollow active material particles comprising a layered LiNiCoMn oxide as an example. However, the applications of this manufacturing method are not limited to manufacturing the perforated hollow active material particles having such a composition. In addition, unless otherwise stated, the method of manufacturing the positive electrode active material particles 610A according to the present invention is not limited to such a manufacturing method.

<<Source Hydroxide Producing Step>>

The method of manufacturing active material particles disclosed herein includes a step of supplying ammonium ions ($NH^{4+}$) to an aqueous solution of a transition metal compound to precipitate particles of a transition metal hydroxide from the aqueous solution (source hydroxide producing step). The solvent (aqueous solvent) that constitutes the above-mentioned aqueous solution is typically water, but may be a mixed solvent containing water as its main component. A suitable example of the solvent that constitutes the mixed solvent other than water is an organic solvent that can mix with water uniformly (such as a lower alcohol). Depending on the composition of the lithium-transition metal oxide that constitutes the active material particles that are the target object to be manufactured, the above-described aqueous solution of a transition metal compound (hereinafter also referred to as "transition metal solution") contains at least one of (preferably all of) the transition metal elements (herein, Ni, Co, and Mn) that constitute the lithium-transition metal oxide. For example, it is possible to use a transition metal solution containing one compound, or two or more compounds, that can supply Ni ions, Co ions, and Mn ions into the aqueous solvent. As the compounds that serve as the source of these metallic ions, it is possible to employ sulfates, nitrates, chlorides, or the like of those metals appropriately. For example, it is possible to use a transition metal solution having the composition in which nickel sulfate, cobalt sulfate, and manganese sulfate are dissolved in an aqueous solvent (preferably water).

The $NH_4^+$ may be supplied to the transition metal solution, for example, in the form of aqueous solution (typically water solution) containing $NH_4^+$, or may be supplied by blowing ammonia gas directly into the transition metal solution. These supplying methods may be combined with each other. The aqueous solution containing $NH_4^+$ can be prepared by, for example, dissolving a compound that can be the source of $NH_4^+$ (such as ammonium hydroxide, ammonium nitrate, or ammonia gas) into an aqueous solvent. In the present embodiment, $NH_4^+$ is supplied in the form of ammonium hydroxide aqueous solution (i.e., ammonia water).

<<Nucleation Stage>>

The source hydroxide producing step can include a stage (nucleation stage) of precipitating a transition metal hydroxide from the transition metal solution under the conditions of equal to or higher than pH 12 (typically from pH 12 to pH 14, for example, from pH 12.2 to 13) and a $NH_4^+$ concentration of less than or equal to 25 g/L (typically from 3 g/L to 25 g/L). The just-mentioned pH and the $NH_4^+$ concentration may be adjusted by appropriately balancing the amounts of the ammonia water and the alkaline agent (the compound that can cause the solution to become alkaline) that are used. Examples of the alkaline agent include sodium hydroxide and potassium hydroxide, which can be typically used in the form of aqueous solution. The present embodiment employs a sodium hydroxide aqueous solution. It should be noted that the pH values mentioned in the present description are the pH values determined at a liquid temperature of 25° C. as the reference.

<<Particle Growth Stage>>

The source hydroxide producing step can further include a stage (particle growth stage) of growing the nuclei of the transition metal hydroxide (typically in a particulate form) that have been precipitated in the nucleation stage at less than pH 12 (typically from pH 10 to less than pH 12, preferably from pH 10 to pH 11.8, for example, from pH 11 to pH 11.8) and a $NH_4^+$ concentration of equal to or higher than 1 g/L, preferably 3 g/L, (typically from 3 g/L to 25 g/L). Normally, it is appropriate to set the pH during the particle growth stage to be lower by 0.1 or greater (typically 0.3 or greater, preferably 0.5 or greater, for example, from about 0.5 to about 1.5) than the pH during the nucleation stage.

The just-mentioned pH and the $NH_4^+$ concentration can be adjusted in the same manner as in the nucleation stage. This particle growth stage allows the rate of precipitation of the transition metal hydroxide (a composite hydroxide containing Ni, Co, and Mn herein) to be quicker by satisfying the pH and the $NH_4^+$ concentration described above, preferably by setting the $NH_4^+$ concentration to be within the range of less than or equal to 15 g/L (e.g., from 1 g/L to 15 g/L, typically from 3 g/L to 15 g/L), more preferably less than or equal to 10 g/L (e.g., from 1 g/L to 10 g/L, typically from 3 g/L to 10 g/L) in the above-described pH range. Thus, it becomes possible to produce the source hydroxide particles that are suitable for the formation of the perforated hollow active material particles disclosed herein (in other words, the source hydroxide particles that can easily form a sintered material having a perforated hollow structure).

The $NH_4^+$ concentration may be set to less than or equal to 7 g/L (e.g., from 1 g/L to 7 g/L, more preferably from 3 g/L to 7 g/L). The $NH_4^+$ concentration at the particle growth stage may be, for example, approximately the same level as the $NH_4^+$ concentration at the nucleation stage, or may be lower than the $NH_4^+$ concentration at the nucleation stage. The rate of precipitation of the transition metal hydroxide can be found by, for example, investigating the change of the total mole number (total ion concentration) of the transition metal ions contained in the liquid phase of the reaction solution with respect to the total mole number of the transition metal ions contained in the transition metal solution supplied to the reaction solution.

It is preferable that the temperature of the reaction solution be controlled to approximately a constant temperature (for example, ±1° C. of a predetermined temperature) within the range of from about 30° C. to about 60° C. in both the nucleation stage and the particle growth stage. It is possible to set the temperature of the reaction solution to the same level both in the nucleation stage and the particle growth stage. In addition, it is preferable that the atmosphere of the reaction solution and in the reaction chamber be kept to be a non-oxidizing atmosphere throughout the nucleation stage and the particle growth stage. In addition, the total mole number (total ion concentration) of Ni ions, Co ions, and Mn ions contained in the reaction solution may be set to be from about 0.5 mol/L to about 2.5 mol/L throughout the nucleation stage and the particle growth stage, preferably from about 1.0 mol/L to 2.2 mol/L. It is desirable that the transition metal solution be supplemented (typically continuously supplied) according to the rate of precipitation of the transition metal hydroxide so that such a total ion concentration can be maintained. It is preferable that the amounts of the Ni ions, the Co ions, and the Mn ions contained in the reaction solution may be set to the quality ratio corresponding to the composition of the active material particles that are the target material (i.e., the mole ratio of Ni, Co, and Mn in the LiNiCoMn oxide that constitutes the active material particles).

<<Mixing Step>>

In the present embodiment, the transition metal hydroxide particles (composite hydroxide particles containing Ni, Co, and Mn herein) are separated from the reaction solution, then washed, and dried. Then, the transition metal hydroxide particles and a lithium compound are mixed at a desired quantity ratio to prepare an unsintered mixture (mixing step). In this mixing step, typically, the Li compound and the transition metal hydroxide particles are mixed at a quantity ratio corresponding to the composition of the active material particles that are the target material (i.e., the mole ratio of Li, Ni. Co, and Mn in the LiNiCoMn oxide that constitutes the active material particles). Preferable examples of the lithium compound include Li compounds that can be melted and turned into an oxide by heating, such as lithium carbonate and lithium hydroxide.

<<Sintering Step>>

Then, the mixture is sintered to obtain active material particles (sintering step). This sintering step is typically performed in an oxidizing atmosphere (for example, in the air (i.e., in the air atmosphere)). The sintering temperature in this sintering step may be set to, for example, from 700° C. to 1100° C. It is preferable that the maximum sintering temperature be 800° C. or higher (preferably from 800° C. to 1100° C., for example, from 800° C. to 1050° C.). With the maximum sintering temperature in these ranges, the sintering reaction of the primary particles of the lithium-transition metal oxide (preferably Ni-containing Li oxide, LiNiCoMn oxide herein) can be allowed to proceed appropriately.

One preferable embodiment includes a first sintering stage of sintering the mixture at a temperature T1 of from 700° C. to 900° C. (that is, 700° C.≤T1≤900° C., for example, 700° C.≤T1≤800° C., typically 700° C.≤T1≤800° C.) and a second sintering stage of sintering the resultant article that has undergone the first sintering stage at a temperature T2 of from 800° C. to 1100° C. (that is, 800° C.≤T2≤1100° C., for example, 800° C.≤T2≤1050° C.). This enables to form the active material particles with the perforated hollow structure efficiently. It is preferable that T1 and T2 be set so that T1<T2.

The first sintering stage and the second sintering stage may be carried out consecutively (for example, it is possible that, after the mixture is kept at the first sintering temperature T1, the temperature is continuously elevated to the second sintering temperature T2 and kept at the temperature T2). Alternatively, it is also possible that, after having been kept at the first sintering temperature T1, the material is cooled (for example, cooled to room temperature), then pulverized, and sieve-classified as necessary, and thereafter supplied to the second sintering stage.

In the technique disclosed herein, the first sintering stage can be understood as a stage during which sintering is carried out at the temperature T1 that is within a temperature range at which the sintering reaction for the target lithium-transition metal oxide proceeds, and lower than or equal to the melting point, and is lower than the temperature of the second sintering stage. The second sintering stage can be understood as a stage during which sintering is carried out at the temperature T2 that is in a temperature range at which the sintering reaction for the target lithium-transition metal oxide proceeds, and lower than or equal to the melting point, but is higher than the temperature of the first sintering stage. It is preferable to provide a temperature difference of equal to or greater than 50° C. or more (typically equal to or greater than 100° C., for example, equal to or greater than 150° C.) between T1 and T2.

Thus, the method of manufacturing the positive electrode active material particles 610A includes the source hydroxide producing step, the mixing step, and the sintering step. Herein, it is desirable that the positive electrode active material particles 610A can be stably obtained in which the proportion of the hollow portion 614 in the apparent cross-sectional area of the positive electrode active material particle 610A is equal to or greater than 23%, and the thickness T of the shell portion 612 of the positive electrode active material particle 610A is thin, less than or equal to 2.2 µm. The following describes a method of manufacturing positive electrode active material particles 610A, which enables to obtain the positive electrode active material particles 610A such as described above more stably.

In order to obtain the positive electrode active material particles 610A more stably, it is desirable to appropriately adjust the pH or the $NH^{4+}$ concentration at the stage of precipitating the transition metal hydroxide from the transition metal solution (i.e., the nucleation stage) and the pH or the $NH^{4+}$ concentration at the stage (particle growth stage) of growing the nuclei of the transition metal hydroxide that have been precipitated at the nucleation stage.

In such a transition metal solution, the following equilibrium reaction is taking place, for example.

[Chemical formula 1]

$$(M1)^{2+} + 6(NH_3) \rightleftharpoons [M1(NH_3)_6]^{2+} \qquad \text{Reaction 1}$$

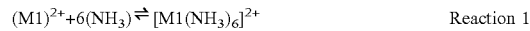

[Chemical formula 2]

$$(M1)^{2+} + 2OH^- \rightleftharpoons M1(OH)_2 \qquad \text{Reaction 2}$$

Here, M1 represents the transition metals contained in the transition metal solution, which include Ni in this embodiment.

That is, in the equilibrium reaction of Reaction 1, the reaction between the transition metal (M1) in the transition metal solution, the ammonia ($NH^3$) supplied to the transition metal solution, and the compound $[M1(NH_3)_6]^{2+}$ of the transition metal (M1) and ammonia ($NH^3$) is in equilibrium. In the equilibrium reaction of Reaction 2, the reaction between the transition metal (M1) in the transition metal solution, the hydroxide ions ($OH^-$) supplied to the transition metal solution, and the transition metal hydroxide [M1 $(OH_2]$ is in equilibrium.

In this case, when the pH in the transition metal solution decreases, the transition metal hydroxide ($M1(OH)_2$) tends to precipitate easily by the equilibrium reaction of Reaction 2. At this time, the transition metal hydroxide ($M1(OH)_2$) is allowed to precipitate easily by keeping the amount of ammonia in the transition metal solution small, proceeding the equilibrium expression to the left side, and increasing the transition metal ions $(M1)2_+$ in the transition metal solution. Thus, the transition metal hydroxide ($M1(OH)_2$) is allowed to precipitate easily by keeping the amount of ammonia in the transition metal solution small and decreasing the pH in the transition metal solution.

For example, at the nucleation stage, the pH should be kept to a certain degree while keeping the solubility of the ammonia ($NH_3$) in the transition metal solution to be low. This makes it possible to control the rate of precipitation of the transition metal hydroxide ($M1(OH)_2$) appropriately. This allows the density of the inner portions of the particles of the transition metal hydroxide, which serve as the precursor, to be low. In addition, at the particle growth stage, the pH should be decreased while keeping the solubility of the ammonia ($NH_3$) in the transition metal solution to be low. This accelerates the rate of precipitation of the transition metal hydroxide ($M1(OH)_2$) at the nucleation stage. As a result, the density of the particles of the transition metal hydroxide, which serve as the precursor, is made higher near the outer surfaces thereof than the density of the inner portions of the particles of the transition metal hydroxide.

Thus, it is possible to make the density of the transition metal hydroxide lower in the inside of the particles and higher near the outer surfaces thereof by appropriately adjusting the pH and the ammonia concentration (ammonium ion concentration) of the transition metal solution at the nucleation stage and at the particle growth stage.

Here, it is desirable that, for example, the pH of the transition metal solution be from 12 to 13 at the nucleation stage, and that the pH of the aqueous solution be from 11 to less than 12 at the particle growth stage. At this time, it is desirable that the pH of the transition metal solution at the nucleation stage be decreased by equal to or greater than 0.1, more preferably by equal to or greater than 0.2, from that at the particle growth stage. In addition, it is desirable that the ammonia concentration (ammonium ion concentration) at the particle growth stage be kept low, from 3 g/L to 10 g/L. This ensures that the rate of precipitation of the transition metal hydroxide ($M1(OH)_2$) becomes quicker at the particle growth stage than at the nucleation stage. Moreover, the density of the particles of the transition metal hydroxide is made higher near the outer surfaces thereof than density of the inner portions of the particles of the transition metal hydroxide more reliably.

It should be noted that the hollow portion 614 of the positive electrode active material particle 610A can be made larger by taking a necessary time at the nucleation stage. In addition, the shell portion 612 of the positive electrode active material particle 610A can be made thinner by increasing the rate of precipitation of the transition metal hydroxide at the particle growth stage and also shortening the time of the particle growth stage.

Additionally, in this case, it is desirable to keep the amount of ammonia in the transition metal solution small. For example, it is desirable that the ammonium ion concentration in the transition metal solution at the nucleation stage be less than or equal to 20 g/L, and that the ammonium ion concentration in the transition metal solution at the particle growth stage be less than or equal to 10 g/L. Thus, it is possible to maintain the ion concentration of the transition metal contained in the transition metal solution to be the necessary amount, by keeping the ammonium ion concentration of the transition metal solution at the nucleation stage and at the particle growth stage. In this case, it is undesirable if the amount of ammonia is too small in the transition metal solution. It is desirable that the ammonium ion concentration in the transition metal solution at the nucleation stage and at the particle growth stage be, for example, equal to or greater than 3 g/L.

In the mixing step, a lithium compound and the transition metal hydroxide are mixed to prepare an unsintered mixture. In the sintering step, the mixture is sintered to obtain positive electrode active material particles 610A. Here, the particle of the transition metal hydroxide, which serves as the precursor of the positive electrode active material particle 610A, has a low density in the inner portion thereof and a high density near the outer surface thereof. As a result, the density of the particles of the transition metal hydroxide, which serve as the precursor, is made higher near the outer surfaces thereof than the density of the inner portions of the particles of the transition metal hydroxide. This enables to form a shell portion 612 of the positive electrode active material particle 610A and also to form a large hollow portion 614. Moreover, when crystals are grown at the time of sintering, a through-hole 616 penetrating through the shell portion 612 is formed in a portion of the shell portion 612. Thus, the positive electrode active material particles 610 each having the shell portion 612, the hollow portion 614, and the through-hole(s) 616 are formed, as illustrated in FIG. 13. Preferably, it is desirable that the sintered material be pulverized after the sintering step, and then sieve-classification is performed, to adjust the particle size of the positive electrode active material particles 610A.

The thus produced positive electrode active material particles 610A each comprise the thin shell portion 612, the wide hollow portion 614, and the through-hole(s) 616 penetrating through the shell portion 612 and spatially connecting the hollow portion 614 and the outside of the shell portion 612 of the positive electrode active material particle 610A with each other. In one preferable embodiment of such positive electrode active material particles 610A, it is possible that the BET specific surface area of the positive electrode active material particles 610A be set to about 0.3 $m^2/g$ to about 2.2 $m^2/g$. More preferably, the BET specific surface area of the positive electrode active material particles 610A may be set to equal to or greater than about 0.5 $m^2/g$, still more preferably equal to or greater than about 0.8 $m^2/g$. The BET specific surface area of the positive electrode active material particles 610A may also be set to, for example, less than or equal to about 1.9 $m^2/g$, more preferably less than or equal to 1.5 $m^2/g$.

In such positive electrode active material particles 610A, the density of the shell portion 612 is high since the source hydroxide producing step includes the nucleation stage and the particle growth stage. Therefore, it is possible to obtain the positive electrode active material particles 610A that are harder and more morphologically stable than those obtained by other manufacturing methods (such as a spray sintering method (also referred to as a spray drying method)).

Such positive electrode active material particles 610A have an average hardness of 0.5 MPa or higher, as determined by a dynamic hardness test that is carried out, for example, using a 50 μm-diameter flat diamond indenter under the condition of a loading rate of from 0.5 mN/sec. to 3 mN/sec.

In another preferable embodiment of the active material particles disclosed herein, the average hardness of the positive electrode active material particles 610A is equal to or greater than about 0.5 MPa. The term average hardness herein refers to the values determined by a dynamic microhardness test that is carried out using a 50 μm-diameter flat diamond indenter under the condition of a loading rate of from 0.5 mN/sec. to 3 mN/sec. For this kind of dynamic microhardness test, it is possible to use, for example, a microhardness tester MCT-W500 made by Shimadzu Corp.

Thus, the positive electrode active material particles 610A have a hollow structure, as illustrated in FIG. 13, and high average hardness (in other words, high shape retention capability). Such positive electrode active material particles 610A can offer a battery that shows higher performance stably. Therefore, the positive electrode active material particles 610A are highly suitable for constructing, for example, a lithium-ion secondary battery that has low internal resistance (in other words, good output power characteristics) and shows low resistance increase even with charge-discharge cycles (especially with charge-discharge cycles involving discharge at high rate).

<<Lithium-Transition Metal Oxide that Constitutes the Positive Electrode Active Material Particles 610A>>

In manufacturing the positive electrode active material particles 610A, it is particularly desirable that the transition metal solution contain nickel. In the case where the transition metal solution contains nickel, particles of the transition metal hydroxide are produced in the form of secondary particles, in which a plurality of fine primary particles in a rice grain-like shape are aggregated, when the transition metal solution precipitates at the nucleation stage and the particle growth stage. Within the temperature range in sintering, crystals grow while almost maintaining the shape of the primary particles of the transition metal hydroxide.

It should be noted that, in the case where the transition metal solution does not contain nickel but contains cobalt and consequently particles of lithium cobalt oxide ($LiCoO_2$) are produced by sintering, the shape of the primary particles cannot be maintained, and the entire particle is sintered. When this is the case, it is difficult to obtain such positive electrode active material particles 610A each having a large hollow portion 614 (see FIG. 13) as described above.

Thus, in order to manufacture the positive electrode active material particles 610A stably, the lithium-transition metal oxide may preferably be a layered compound containing nickel as a constituent element thereof. When nickel is contained, it is possible to form particles of the transition metal hydroxide (precursor particles) in which the density of the inner portions thereof is low and the density of the portions thereof near the outer surfaces is high. Using such precursor particles in which the density of the inner portions thereof is low and the density of the portions thereof near the outer surfaces is high, crystals can be grown in the sintering step while almost maintaining the shape of the primary particles. This makes it possible to manufacture the positive electrode active material particles 610A each comprise the shell portion 612, the hollow portion 614, and the through-hole(s) 616 (see FIG. 13).

In this case, it is desirable that proportion of nickel (composition ratio) is about equal to or greater than 0.1%, more preferably equal to or greater than 0.25%, in the transition metals contained in the positive electrode active material particles 610A.

In addition, the lithium-transition metal oxide may be a layered compound containing nickel, cobalt, and manganese as its constituent elements. For example, it is desirable that the lithium-transition metal oxide be a layered compound contained as $Li_{1+x}Ni_yCo_zMn_{(1-y-z)}M_\gamma O_2$. In the formula, $0 \leq x \leq 0.2$, $0.1 < y < 0.9$, $0.1 < z < 0.4$, M is an additive, and $0 \leq \gamma \leq 0.01$. For example, it is desirable that M be at least one additive selected from the group consisting of Zr, W, Mg, Ca, Na, Fe, Cr, Zn, Si, Sn, Al, B, and F. Such a lithium-transition metal oxide forms a layered compound, which can retain lithium ions in the interlayer spaces. Moreover, it is particularly suitable for manufacturing the positive electrode active material particles 610A each comprising the shell portion 612, the hollow portion 614, and the through-hole(s) 616.

Thereby, it is possible to stably obtain the positive electrode active material particles 610A in which the proportion of the hollow portion 614 in the apparent cross-sectional area of the positive electrode active material particle 610A is equal to or greater than 23%, and the thickness T of the shell portion 612 of the positive electrode active material particle 610A is thin, less than or equal to 2.2 μm.

As described previously, the lithium-ion secondary battery 100A has the positive electrode current collector 221A (current collector) and the porous positive electrode active material layer 223A retained on the positive electrode current collector 221A, as illustrated in FIGS. 1 through 3. As illustrated in FIG. 4, the positive electrode active material layer 223A contains the positive electrode active material particles 610A, the conductive agent 620A, and the binder 630A. In this embodiment, as illustrated in FIG. 13, the positive electrode active material particles 610A each comprise the shell portion 612 comprising a lithium-transition metal oxide, the hollow portion 614 formed inside the shell portion 612, and the through-hole(s) 616 penetrating through the shell portion 612.

In this lithium-ion secondary battery 100A, the proportion of the hollow portion 614 is equal to or greater than 23% of the apparent cross-sectional area of the positive electrode active material particle 610A (see FIG. 13), in average of the positive electrode active material layer 223A. In addition, the thickness of the shell portion 612 at an arbitrary position in the inner surface 612a of the shell portion 612 is defined by the minimum distance T(k) from an arbitrary position k to an outer surface of the shell portion 612 in an arbitrary cross section of the positive electrode active material layer 223A. In this case, the thickness of the shell portion 612 is less than or equal to 2.2 μm in average in an arbitrary cross section of the positive electrode active material layer 223A.

In this lithium-ion secondary battery 100A, the proportion of the hollow portion 614 is equal to or greater than 23% of the apparent cross-sectional area of the positive electrode active material particle 610A (see FIG. 13), in average of the positive electrode active material layer 223A, which means that the hollow portion 614 is large. In this lithium-ion secondary battery 100A, the electrolyte solution 280 (see FIGS. 7 and 8) can be impregnated sufficiently into the hollow portion 614 of each of the positive electrode active material particles 610A in positive electrode active material layer 223A. Moreover, in this lithium-ion secondary battery 100A, the thickness of the shell portion 612 is less than or equal to 2.2 μm, in average in an arbitrary cross section of the positive electrode active material layer 223A, which means that the shell portion 612 of the positive electrode active material particle 610A is thin. As a result, the positive electrode active material particles 610A allow lithium ions to quickly diffuse into the inner portion of the shell portion 612 (i.e., the inside of the active material). Therefore, the lithium-ion secondary battery 100A can produce high output power even at a low charge level.

In this case, it is desirable that the thickness of the shell portion 612 be equal to or greater than 0.05 μm, more preferably equal to or greater than 0.1 μm, in average of the positive electrode active material layer 223A. When the thickness of the shell portion 612 be equal to or greater than 0.05 μm, more preferably equal to or greater than 0.1 μm, a required mechanical strength is provided for the positive electrode active material particles 610A. The positive electrode active material particles 610A undergo expansion and shrinkage as the release and absorption of lithium ions are repeated. Sufficient strength is ensured for expansion and shrinkage. Therefore, the durability of the positive electrode active material particles 610A is improved, and the performance of the lithium-ion secondary battery 100A can be made stable over time.

It is also desirable that the through-hole(s) 616 have an aperture width of equal to or greater than 0.01 μm in average of the positive electrode active material layer 223A. Herein, the aperture width of a through-hole 616 is the length across the narrowest portion of the path in which the through-hole 616 extends from the outside of the positive electrode active material particle 610A to the hollow portion 614. When the aperture width of the through-holes 616 is 0.01 μm in average, the electrolyte solution 280 (see FIGS. 7 and 8) can sufficiently enter the hollow portion 614 from outside through the through-holes 616. As a result, the advantageous effect of improving the battery performance of the lithium-ion secondary battery 100A can be obtained more appropriately.

Generally, the thin shell portion 612, the wide hollow portion 614, and the through-holes 616 with wide aperture width such as in the positive electrode active material particles 610A cannot be achieved by other manufacturing methods (such as a spray sintering method (also referred to as a spray drying method)).

The mean value of the above-mentioned aperture width (average aperture size) can be obtained by, for example, taking at least 10 samples of the positive electrode active material particles 610A, finding the aperture widths of a portion or all of the through holes 616 for each sample of the positive electrode active material particles 610A, and obtaining the arithmetic mean value thereof. It is sufficient that the through-hole(s) 616 should be suitable for the electrolyte solution 280 to impregnate into the hollow portion 614, so it is desirable that the through-hole(s) 616 have an aperture width of less than or equal to about 2.0 μm in average of the positive electrode active material layer 223A. Also, it is desirable that the through-hole(s) 616 have an aperture width of equal to or greater than 0.01 μm in average of the positive electrode active material layer 223A.

In this lithium-ion secondary battery 100A, the positive electrode active material particles 610 each have the shell portion 612, the hollow portion 614, and the through-hole(s) 616, as described above. Furthermore, the present inventor proposes that the major axis length L1 of the primary particles 800 of the positive electrode active material particles 610A should be less than or equal to 0.8 μm. The use of such positive electrode active material particles 610A can improve the output power of the lithium-ion secondary battery 100A especially in a low SOC region.

<<Control of Major Axis Length L1 of Primary Particles 800>>

As a result of assiduous studies, the present inventor discovered that the major axis length L1 of the primary particles 800 of the positive electrode active material particles 610A can be controlled by the sintering temperature and the sintering time, for example, in the above-described manufacturing method. The present inventor believes that it is appropriate to carry out the sintering at a sintering temperature of from about 750° C. to 950° C. for a sintering time of from 5 hours to 15 hours. Moreover, the major axis length L1 of the primary particles 800 of the positive electrode active material particles 610A can also be varied by the amount of Li relative to the transition metal (Me) contained in the positive electrode active material particles 610A. The present inventor suggests that the amount of Li relative to that of the transition metal (Me) be adjusted to be a mole ratio (Li/Me)=1.03 to 1.22. In this case, the mole ratio should preferably be set to equal to or greater than 1.05, for example, equal to or greater than 1.07. On the other hand, the mole ratio should preferably be set to less than or equal to 1.20, for example, less than or equal to 1.18.

<<Addition of Tungsten>>

According to the knowledge of the present inventor, it is desirable that tungsten be added to the positive electrode active material particles 610A, in order to make the major axis length L1 of the primary particles 800 of the positive electrode active material particles 610A less than or equal to about 0.8 μm.

The present inventor also discovered that, in the case of adding tungsten to the positive electrode active material particles 610A, the major axis length L1 of the primary particles 800 of the positive electrode active material particles 610A can be adjusted by the amount of tungsten added. Specifically, in order to obtain the positive electrode active material particles 610A in which the major axis length L1 of the primary particles 800 is less than or equal to 0.8 μm with the layered lithium-transition metal oxide containing nickel, cobalt, and manganese as its constituent elements as described above, it is desirable to add 0.05 mol % to 2.0 mol % of tungsten relative to the transition metals. It is desirable that the amount of tungsten added should be, for example, equal to or greater than 0.1 mol %, more preferably equal to or greater than 0.2 mol % relative to the amount of the transition metals. On the other hand, the amount of tungsten added may be, for example, less than or equal to 1.5 mol %, or less than or equal to 1.0 mol %. This makes it easy to control the major axis length L1 of the primary particles 800 of the positive electrode active material particles 610A.

<<Evaluation of Positive Electrode Active Material Particles 610>>

In the following, the present inventor prepared a plurality of types of positive electrode active material particles that have different major axis lengths L1 of primary particles 800. Test batteries were prepared for the respective particles to compare their battery performance. In association with their major axis lengths L1 of the primary particles 800, the plurality of types of positive electrode active material particles prepared here are different in the thickness of the shell portion 612, the particle void fraction, the presence or absence of the through-hole(s) 616, the amount of Li relative to that of the transition metal, the amount of tungsten added, and so forth.

<<Test Battery>>

Hereinbelow, the structure of the test batteries is described. The test battery is a flat prismatic battery as illustrated in FIG. 1, and the basic structure thereof is substantially the same as that of the above-described lithium-ion secondary battery 100A. For this reason, reference is made to the drawings for the lithium-ion secondary battery 100A as appropriate to describe the test battery. For the test battery, the portions and components that exhibit the same functions as those in the lithium-ion secondary battery 100A are denoted by the same reference signs.

<<Negative Electrode of the Test Battery>>

As illustrated in FIGS. 1 and 5, the negative electrode of the test battery has a negative electrode current collector 241 and a negative electrode active material layer 243 retained on the negative electrode current collector 241. The negative electrode active material layer 243 has negative electrode active material particles 710 and a binder 730.

This test battery uses a copper foil having a thickness of about 10 μm as the negative electrode current collector 241. The negative electrode current collector 241 is a strip-shaped sheet material having a width of about 120 mm and a length of about 3200 mm, in which an uncoated portion 242 being devoid of the negative electrode active material layer 243 is provided in one lateral-side edge thereof along the longitudinal direction. The negative electrode active material layer 243 is retained on both faces of the negative electrode current collector 241 in the region except for the uncoated portion 242 (in the region having a width of about 105 mm).

<<Negative Electrode Active Material Particles of the Test Battery>>

The negative electrode active material particles 710 (see FIG. 5) contained in the negative electrode active material layer 243 are graphite particles that are prepared by mixing and impregnating 4 mass % of pitch into 96 mass % of natural graphite powder, and sintering the resultant material under an inert atmosphere at 1000° C. to 1300° C. for 10 hours. By sieving the thus-obtained graphite particles, the negative electrode active material particles 710 used here are adjusted so that the average particle size (median diameter D50) thereof falls within the range of from about 8 μm to about 11 μm, and the specific surface area thereof falls within the range of from about 3.5 $m^2/g$ to about 5.5 $m^2/g$.

<<Preparation of Negative Electrode Active Material Layer 243>>

The negative electrode active material layer 243 further contains a thickening agent. The thickening agent is a material for adjusting the viscosity of the mixture prepared in forming the negative electrode active material layer 243. Here, carboxymethylcellulose (CMC) is used as such a thickening agent. Styrene-butadiene rubber (SBR) is used as the binder 730 (binder agent).

Here, the negative electrode active material particles 710, the thickening agent, and the binder 730 are kneaded with water in a weight ratio of about 98.6:0.7:0.7, to prepare a negative electrode mixture in a paste form (i.e., the negative electrode paste). Then, the negative electrode mixture is coated on both faces of the negative electrode current collector 241 except for the uncoated portion 242, and the coated current collector is dried, to form the negative electrode active material layer 243. The resultant article is further pressure-rolled by a roll press machine so that the density of the just-mentioned negative electrode active material layer 243 becomes from about 1.0 $g/cm^3$ to about 1.2 $g/cm^3$. Thus, a negative electrode sheet 240 (see FIG. 2) can be obtained. Herein, the weight per unit area of the negative electrode active material layer 243 after dried was adjusted to about 7.5 $mg/cm^2$ in total of both layers on the negative electrode current collector 241. In addition, both layers on the negative electrode current collector 241 were adjusted to have substantially the same weight per unit area.

<<Positive Electrode of the Test Battery>>

As illustrated in FIGS. 1 and 6, the positive electrode of the test battery comprises the positive electrode current collector 221 and the positive electrode active material layer 223 retained on the positive electrode current collector 221. The positive electrode active material layer 223 has the positive electrode active material particles 610A, the conductive agent 620A, and the binder 630A (see FIG. 11).

In this test battery, an aluminum foil having a thickness of about 15 μm is used as the positive electrode current collector 221. The positive electrode current collector 221 is a strip-shaped sheet material having a width of about 115 mm and a length of about 3000 mm, in which an uncoated portion 222 being devoid of the positive electrode active material layer 223 is provided in one lateral-side edge thereof along the longitudinal direction. The positive electrode active material layer 223 is retained on both faces of the positive electrode current collector 221 in the region except for the uncoated portion 222 (in the region having a width of about 95 mm).

<<Positive Electrode Active Material Particles of the Test Battery>>

The positive electrode active material particles 610A (see FIG. 11) contained in the positive electrode active material layer 223 are obtained as follows. A mixed solution of nickel sulfate ($NiSO_4$), cobalt sulfate ($CoSO_4$), and manganese sulfate ($MnSO_4$) is neutralized by sodium hydroxide (NaOH). Then, a transition metal hydroxide that serves as the precursor is obtained in the step (source hydroxide producing step) of supplying ammonium ions ($NH^{4+}$) to such an aqueous solution of a transition metal compound to precipitate particles of a transition metal hydroxide from the aqueous solution. This means that Ni, Co, and Mn are contained approximately in a predetermined ratio in the transition metal hydroxide, which serves as the precursor, in this test battery. Note that, in the case of obtaining the positive electrode active material particles 610A containing tungsten, an aqueous solution a transition metal compound containing tungsten was produced in the source hydroxide producing step in this evaluation test. Then, in the nucleation stage, the transition metal hydroxide containing tungsten was obtained as the transition metal hydroxide that serves as the precursor.

For this the test battery, lithium carbonate ($Li_2Co_3$) is mixed with the transition metal hydroxide, which serves as the precursor, in the previously-described mixing step. Then, in the sintering step, the resultant mixture is sintered at about 800° C. to about 950° C. for 5 hours to 15 hours. Thus, the positive electrode active material particles 610A substantially having $Li_{1.14}Ni_{0.33}Co_{0.33}Mn_{0.33}O_2$ as its basic composition were fabricated. As illustrated in FIG. 13, such positive electrode active material particles 610A each comprise the shell portion 612, the hollow portion 614, and the through-holes 616. Furthermore, the thus-obtained positive electrode active material particles 610A are sieved and adjusted so that the average particle size (median diameter D50) can fall within the range of from about 3 μm to about 8 μm, and the specific surface area thereof can fall within the range of from about 0.5 $m^2/g$ to about 1.9 $m^2/g$.

Here, according to the above-described manufacturing method, samples of the positive electrode active material particles 610A that are different in the major axis length L1 of the primary particles 800, the thickness of the shell portion 612, the particle void fraction, and the presence or absence of the through-hole(s) 616 were prepared by varying the amount of Li relative to the transition metal (mole ratio (Li/Me)), the amount of tungsten added (W amount added), and the sintering temperature. In order to compare and analyze to what degree the performance of the test battery can change, the composition of the positive electrode active material particles 610A was made generally the same in the samples except for the amount of Li relative to the transition metal (mole ratio (Li/Me)) and the amount of tungsten added (W amount added).

<<Preparation of Positive Electrode Active Material Layer 223A>>

The positive electrode active material layer 223A contains the positive electrode active material particles 610A, the conductive agent 620A, and the binder 630A. In this test battery, acetylene black is used as the conductive agent 620A for the positive electrode active material layer 223A, and polyvinylidene fluoride (PVDF) is used as the binder 630. The positive electrode active material particles 610A, the conductive agent 620A, and the binder 630A are mixed in a weight ratio of 90:8:2 and kneaded with N-methyl-2-pyrrolidone (NMP) to prepare a positive electrode mixture in a paste form (i.e., positive electrode paste).

Then, the positive electrode mixture is coated on both faces of the positive electrode current collector 221A except for the uncoated portion 222A, and the coated current collector is dried, to form the positive electrode active material layer 223A. The resultant article is further pressure-rolled by a roll press machine so that the density of the just-mentioned positive electrode active material layer 223A becomes about 2.1 g/cm$^3$. Thus, a positive electrode sheet 220 (see FIG. 2) can be obtained. Herein, the weight per unit area of the positive electrode active material layer 223A after dried was adjusted to about 11.8 mg/cm$^2$ in total of both layers on the positive electrode current collector 221A. In addition, both layers on the positive electrode current collector 221A were adjusted to have substantially the same weight per unit area.

<<Electrolyte Solution of the Test Battery>>

Next, the electrolyte solution of the test battery will be described below. For this test battery, the electrolyte solution was prepared by mixing ethylene carbonate (EC), ethyl methyl carbonate (EMC), and dimethyl carbonate (DMC) at a ratio (mole ratio) of 3:3:4, and dissolving 1.1 mol/L of LiPF$_6$ therein. It is also possible to use, as appropriate, an electrolyte solution in which difluorophosphate (LiPO$_2$F$_2$) and lithium bis(oxalato)borate (LiBOB), either alone or in combination, are dissolved at a concentration of about 0.01 mol/L to 0.03 mol/L in the solvent.

<<Preparation of Test Battery>>

Next, the test battery is fabricated as follows. Generally as illustrated in FIGS. 1 and 2, the positive electrode sheet 220 and the negative electrode sheet 240 prepared in the foregoing manner are stacked with the separators 262 and 264 interposed therebetween, and wound together. Then, the resultant wound component is pressed in one direction orthogonal to the winding axis WL (see FIG. 2) and deformed into a flat shape, to prepare the wound electrode assembly 200. In the wound electrode assembly 200, the uncoated portion 222 of the positive electrode sheet 220 and the uncoated portion 242 of the negative electrode sheet 240 are exposed at the opposite sides of the separators 262 and 264.

In this test battery, the positive/negative capacity ratio calculated from the charge capacity of the positive electrode and the charge capacity of the negative electrode is adjusted to 1.5 to 1.9.

The battery case 300 of the test battery is generally what is called a prismatic battery case, as illustrated in FIG. 1, and it includes the case main body 320 and the lid 340. The battery case 300 has a closed-bottom quadrangular prismatic tubular case main body 320, which has a flat rectangular internal space as the space for accommodating the wound electrode assembly 200, and a lid 340 for closing the opening of the case main body 320. To the lid 340 of the battery case 300, electrode terminals 420 and 440 are attached. The uncoated portion 222 of the positive electrode sheet 220 of the wound electrode assembly 200 is connected to the electrode terminal 420. The uncoated portion 242 of the negative electrode sheet 240 of the wound electrode assembly 200 is connected to the electrode terminal 440.

In this test battery, the wound electrode assembly 200 attached to the electrode terminals 420 and 440 of the lid 340 in this way is accommodated in the case main body 320. Thereafter, the joint part 322 between the case main body 300 and the lid body 340 of the battery case 300 is welded by laser welding, the electrolyte solution is filled into the battery case 300 through a filling port 350 provided in the lid 340, and the filling port 350 is closed.

<<Conditioning>>

Next, the conditioning process, the measurement of the rated capacity, and the SOC adjustment for the test battery constructed in the above-described manner will be described in that order.

The conditioning process is carried out according to the following procedures 1 and 2.

Procedure 1: The test battery is charged with a constant current at 1 C to 4.1 V and thereafter rested for 5 minutes.

Procedure 2: After procedure 1, the test battery is charged with a constant voltage for 1.5 hours and then rested for 5 minutes.

<<Measurement of Rated Capacity>>

Next, after the above-described conditioning process, the rated capacity is measured for each of the evaluation test batteries at a temperature of 25° C. and in a voltage range of from 3.0 V to 4.1 V, through the following procedures 1 through 3.

Procedure 1: The test battery is discharged with a constant current at 1 C to 3.0 V, then discharged with a constant voltage for 2 hours, and thereafter rested for 10 seconds.

Procedure 2: The test battery is charged with a constant current at 1 C to 4.1 V, then charged with a constant voltage for 2.5 hours, and thereafter rested for 10 seconds.

Procedure 3: The test battery is discharged with a constant current at 0.5 C to 3.0 V, then discharged with a constant voltage for 2 hours, and thereafter rested for 10 seconds.

Rated capacity: The discharge capacity (CCCV discharge capacity) obtained in the discharge process starting from the constant-current discharging and finishing with the constant-voltage discharging in Procedure 3 is defined as the rated capacity. In this test battery, the rated capacity is about 4 Ah.

<<SOC Adjustment>>

The SOC adjustment is carried out according to the following procedures 1 and 2. It is desirable to perform the SOC adjustment after the above-described conditioning process and the measurement of rated capacity. Herein, in order to make the influence of temperature uniform, the SOC adjustment is carried out in a temperature environment at a temperature of 25° C.

Procedure 1: The test battery is charged from 3 V with a constant current at 1 C so as to be in a state of charge of about 60% of the rated capacity (60% SOC). Here, the term "SOC" means the state of charge.

Procedure 2: After procedure 1, the test battery is charged with a constant voltage for 2.5 hours.

This enables the test battery to be adjusted to a predetermined state of charge.

Herein, a plurality of samples of the test battery in which substantially only the positive electrode active material particles 610A are different were prepared to compare and analyze the performance of the test battery. In addition, in order to evaluate the output power characteristics at low temperature and in a low charge level, the "output power characteristics in a charged state at −30° C. and at a SOC of 27%" were evaluated as the performance of the test battery.

<<Output Power Characteristics in a Charged State at −30° C. And a SOC of 27%>>

The output power characteristics in a charged state at −30° C. and at a SOC of 27% (hereinafter simply referred to as "output power characteristics 1") can be evaluated by the following procedures.

Procedure 1 [SOC adjustment]: As a SOC adjustment, the test battery is adjusted to a SOC of 27% (a battery voltage value of 3.553 V herein) by 1 C constant current charge in a temperature environment at room temperature (25° C. herein). Next, the test battery is charged with a constant voltage for 1 hour.

Procedure 2 [setting aside for 6 hours at −30° C.]: After procedure 1, the test battery adjusted to a SOC of 27% is set aside for 6 hours in a thermostatic chamber at −30° C.

Procedure 3 [constant wattage discharge]: After procedure 2, the test battery is discharged at a constant wattage (W) in a temperature environment of −30° C. At this time, the number of seconds from the start of the discharge until the battery voltage reaches 2.0 V is measured.

Procedure 4 [repeat]: While changing the constant wattage discharge voltage in procedure 3 within the range of 80 W to 200 W, the foregoing procedures 1 through 3 are repeated. Here, the foregoing procedures 1 through 3 are repeated while increasing the constant wattage discharge voltage in procedure 3 by 10 W at every time, e.g., 80 W at the first time, 90 W at the second time, 100 W at the third time, . . . and so forth, until the constant wattage discharge voltage reaches 200 W. Herein, the constant wattage discharge voltage in procedure 3 is increased by 10 W for each time. In addition to this, the constant wattage discharge voltage in procedure 3 may be increased by a certain wattage for each time (for example, by 5 W for each time, or by 15 W for each time). It is also possible to decrease the constant wattage discharge voltage by a certain wattage for each time from 500 W (for example, by 5 W for each time, by 10 W for each time, or by 15 W for each time).

Figure 19:
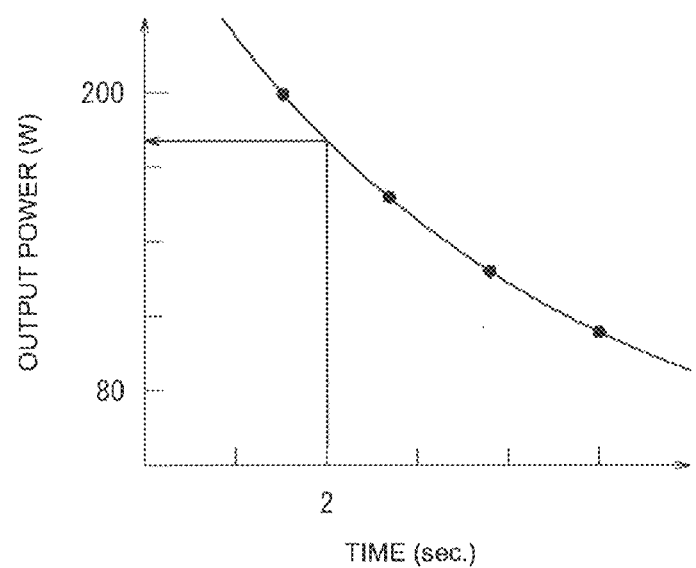
FIG. 19 is a graph illustrating a fitted curve for calculating output power characteristics 1.

Procedure 5 [calculation of output power characteristics 1]: For example, as illustrated in FIG. 19, the number of seconds it takes to reach 2.0 V, which is measured under the constant wattage condition in Procedure 4, is plotted along the horizontal axis, and the wattage at that time is plotted along the vertical axis. Then, from the approximated curve of the plots, the wattage at 2 seconds is calculated as the output power characteristics 1.

Such output power characteristics 1 indicate the output power that the test battery can provide in the case where the battery is set aside at a low charged state of about 27% SOC and in an extremely low temperature environment of −30° C. Accordingly, the output power characteristics 1 demonstrate that the higher the wattage is, the higher output power the test battery can produce. Moreover, the output power characteristics 1 also demonstrate that the higher the wattage is, the more stably the test battery can obtain output power even at a low charged stage of about 27% SOC.

Table 1 shows the major axis length L1 of the primary particles 800 of the positive electrode active material particles 610A, the thickness of the shell portion 612, the particle void fraction, the presence or absence of through-holes, the amount of Li (mole ratio (Li/Me)) relative to the transition metal (Me), the amount of tungsten added (W amount added), the sintering temperature, and the just-described output power characteristics 1 of the test battery, for a plurality of samples of the test battery in which substantially only the positive electrode active material particles 610A are different.

TABLE 1

| Sample | Major axis length of primary particle μm | Thickness of shell portion μm | Particle void fraction % | Through-hole — | Li/Me — | Amount of W added mol % | Sintering temperature ° C. | Output power at −30° C. and 27% SoC W |
|---|---|---|---|---|---|---|---|---|
| 1 | 0.65 | 2.19 | 23.7 | Yes | 1.14 | 0.5 | 930 | 118 |
| 2 | 0.66 | 1.07 | 36.4 | Yes | 1.14 | 0.9 | 930 | 129 |
| 3 | 0.66 | 0.68 | 45.9 | Yes | 1.07 | 0.8 | 930 | 135 |
| 4 | 0.38 | 0.48 | 68.2 | Yes | 1.14 | 0.5 | 800 | 151 |
| 5 | 0.47 | 0.51 | 53.4 | Yes | 1.14 | 0.9 | 850 | 145 |
| 6 | 0.51 | 0.49 | 54.5 | Yes | 1.07 | 0.8 | 860 | 140 |
| 7 | 0.55 | 0.50 | 52.1 | Yes | 1.15 | 0.7 | 880 | 136 |
| 8 | 0.59 | 0.51 | 57.8 | Yes | 1.15 | 0.5 | 880 | 132 |
| 9 | 0.65 | 0.52 | 51.2 | Yes | 1.09 | 0.5 | 900 | 131 |
| 10 | 0.68 | 0.51 | 48.6 | Yes | 1.18 | 0.5 | 930 | 128 |
| 11 | 0.75 | 0.53 | 50.9 | Yes | 1.14 | 0.5 | 930 | 121 |
| 12 | 0.79 | 0.54 | 50.1 | Yes | 1.07 | 0.1 | 950 | 118 |
| 13 | 0.84 | 0.55 | 58.3 | Yes | 1.12 | 0.1 | 980 | 115 |
| 14 | 0.85 | 0.55 | 54.4 | Yes | 1.14 | 0.1 | 980 | 112 |
| 15 | 0.88 | 0.54 | 57.6 | Yes | 1.05 | 0.1 | 970 | 108 |
| 16 | 0.91 | 0.57 | 47.2 | Yes | 1.14 | 0 | 960 | 101 |
| 17 | 0.95 | 0.58 | 46.1 | Yes | 1.04 | 0 | 960 | 90 |
| 18 | 1.04 | 0.61 | 43.8 | Yes | 1.14 | 0 | 1000 | 72 |
| 19 | 0.68 | 1.69 | 19.3 | No | 1.14 | 0.5 | 930 | 86 |
| 20 | 0.65 | 2.81 | 3.1 | No | 1.14 | 0.5 | 930 | 68 |
| 21 | 0.66 | 3.03 | 3.9 | No | 1.14 | 0.5 | 930 | 81 |
| 22 | 0.61 | 2.65 | 2.6 | No | 1.14 | 0.5 | 930 | 71 |

As seen from Table 1, when comparing the case where the positive electrode active material particles 610A have the through-holes 616 and the case where they do not, the output power characteristics 1 tend to show clearly higher values when the through-holes 616 are present. Herein, the presence or absence of the through-holes 616 was confirmed from the cross-sectional SEM image of the positive electrode active material particles 610A or the cross-sectional SEM image of the positive electrode active material layer 223.

When the through-holes are present in a similar fashion, the output power characteristics 1 generally tend to show higher values when the particle void fraction of the positive electrode active material particles 610A is higher. Moreover, the output power characteristics 1 generally tend to show higher values when the shell portion 612 of the positive electrode active material particle 610A is thinner. However, there are cases in which differences in the output power characteristics 1 are observed even when the samples have approximately the same particle void fraction of the positive electrode active material particles 610A and approximately the same thickness of the shell portion 612 of the positive electrode active material particle 610A.

Concerning this point, when attention is focused on the major axis length L1 of the primary particles 800 of the positive electrode active material particles 610A, the smaller the major axis length L1 is, the higher value the output power characteristics 1 tend to show generally, even when the particle void fraction of the positive electrode active material particles 610A and the thickness of the shell portion 612 of the positive electrode active material particle 610A are approximately the same.

As described above, the lithium-ion secondary battery 100A according to one embodiment of the present invention comprises the positive electrode current collector 221A and the porous positive electrode active material layer 223A retained on the positive electrode current collector 221A, as illustrated in, for example, FIGS. 9 to 11. Here, as illustrated in FIG. 11, the positive electrode active material layer 223A contains the positive electrode active material particles 610A, the conductive agent 620A, and the binder 630A.

In such a lithium-ion secondary battery 100A, as illustrated in FIG. 13, for example, the positive electrode active material particles 610A each comprise the shell portion 612 comprising a lithium-transition metal oxide, the hollow portion 614 formed inside the shell portion 612, and the through-hole(s) 616 penetrating through the shell portion 612. In addition, the primary particles 800 of the lithium-transition metal oxide have a major axis length of less than or equal to 0.8 µm in average of the positive electrode active material layer 223A.

The lithium-ion secondary battery 100A can reduce the diffusion resistance of lithium ions especially in the positive electrode, and can improve the output power particularly at a low charge level (for example, at a SOC of about 27%) during charge. Furthermore, the lithium-ion secondary battery 100A can keep high output power characteristics even at low temperatures (for example, at −30° C.).

In this case, it is desirable that the major axis length of the primary particles 800 of the lithium-transition metal oxide be equal to or greater than 0.2 µm (for example, equal to or greater than 0.4 µm). This enables the positive electrode active material particles 610A to have required strength.

As one preferable embodiment of this lithium-ion secondary battery 100A, the proportion of the hollow portion 614 is equal to or greater than 23% of the apparent cross-sectional area of the positive electrode active material particle 610A, in average of the positive electrode active material layer 223A. Furthermore, it is desirable that the thickness of the shell portion 612 be less than or equal to 2.2 µm in average of the positive electrode active material layer 223A.

In this case, with the lithium-ion secondary battery 100A, the proportion of the hollow portions 614 in the apparent cross-sectional area of the positive electrode active material particles 610A is equal to or greater than 23% in average of the positive electrode active material layer 223; the positive electrode active material particles 610A have the through-holes 616 penetrating through the shell portion 612; and moreover, the thickness T of the shell portion 612 of the positive electrode active material particles 610A is very thin (less than or equal to 2.2 µm herein). As a result, lithium ions diffuse into the inner portion of the shell portion 612 (i.e., the inside of the active material) quickly. Therefore, the lithium-ion secondary battery can produce high power stably even at a low charge level.

Herein, the thickness T(k) of the shell portion 621 at an arbitrary position k within an inner surface of the shell portion 612 is defined by the minimum distance from the arbitrary position within the inner surface of the shell portion 612 to an outer surface of the shell portion 612, in an arbitrary cross section of the positive electrode active material layer 223A. It is desirable that the thickness of the shell portion 612 of the positive electrode active material particle 610A in average of the positive electrode active material layer 223A be obtained by, for example, obtaining the thickness of the shell portion 612 of the positive electrode active material particle 610A in a plurality of arbitrary cross sections of the positive electrode active material layer 223A, and determining the arithmetic mean value of the thickness of the shell portions 612 of the positive electrode active material particles 610A.

In this case, the arithmetic mean value converges by increasing the number of cross sections of the positive electrode active material layer 223 for obtaining the thickness of the shell portion 612 of the positive electrode active material particle 610A, or by increasing the number of arbitrary positions k in the inner surface of the shell portion 612 for obtaining the thickness of the shell portion 612 of the positive electrode active material particle 610A. The phrase "the thickness of the shell portion 612 is less than or equal to 2.2 µm in average of the positive electrode active material layer 223A" means that the just-mentioned arithmetic mean value is less than or equal to 2.2 µm.

This lithium-ion secondary battery 100 has such a tendency that the greater the particle void fraction of the positive electrode active material particles 610A is, the better the output power characteristics thereof is. Preferably, the particle void fraction of the positive electrode active material particles 610A should be equal to or greater than 30%, more preferably equal to or greater than 45%, and still more preferably equal to or greater than 60%. Furthermore, this lithium-ion secondary battery 100 has such a tendency that the thinner the shell portion 612 of the positive electrode active material particle 610A is, the better the output power characteristics thereof is. Preferably, the thickness of the shell portion 612 of the positive electrode active material particle 610A should be less than or equal to 1.5 µm, more preferably less than or equal to 1.00 µm, still more preferably less than or equal to 0.8 µm, and yet more preferably less than or equal to 0.4 µm. Additionally, in order to ensure the durability of the positive electrode active material particles 610A in use, it is desirable that the thickness of the shell portion 612 be, for example, equal to or greater than 0.05 μm, more preferably equal to or greater than 0.1 μm.

Furthermore, the lithium-transition metal oxide that constitutes the shell portion 612 of the positive electrode active material particles 610A should desirably be a layered compound containing nickel as a constituent element thereof. Such a lithium-transition metal oxide may be, for example, a layered compound containing nickel, cobalt, and manganese as its constituent elements. It is also possible that the lithium-transition metal oxide may be a layered compound contained as $Li_{1+x}Ni_yCo_zMn_{(1-y-z)}M_\gamma O_2$. In the formula, 0≤x≤0.2, and 0.1<y<0.9, 0.1<z<0.4, M is an additive, and 0≤γ≤0.01. Moreover, the additive M may be at least one additive selected from the group consisting of Zr, W, Mg, Ca, Na, Fe, Cr, Zn, Si, Sn, Al, B, and F.

As already described above, the lithium-ion secondary battery 100A can reduce the diffusion resistance of lithium ions especially in the positive electrode, and can improve the output power characteristics at low temperatures more reliably. Moreover, the lithium-ion secondary battery 100A can obtain more stable output power even at a low charge level more reliably. Therefore, the lithium-ion secondary battery 100A is suitable for, for example, a lithium-ion secondary battery as a vehicle drive battery, which has a high capacity, for example, a rated capacity of equal to or higher than 3 Ah. Such a lithium-ion secondary battery 100 can provide stable output power even at a lower charge level, so the battery can operate in a wider range of SOC. As a result, a greater amount of electric power can be obtained from the lithium-ion secondary battery 100. Such a lithium-ion secondary battery 100 can extend the driving range on a single charge when used as a vehicle drive battery.

More preferably, the positive electrode active material particles 610A should desirably be positive electrode active material particles that are manufactured by, for example, a method comprising: a source hydroxide producing step of supplying ammonium ions to a transition metal solution (aqueous solution of a transition metal compound) to precipitate particles of a transition metal solution from the transition metal solution; a mixing step of mixing the transition metal hydroxide with a lithium compound to prepare an unsintered mixture; and a sintering step of sintering the mixture to obtain active material particles. Here, the aqueous solution desirably contains at least one transition metal element that constitutes the lithium-transition metal oxide.

It is desirable that the source hydroxide producing step include a nucleation stage of precipitating a transition metal hydroxide from the transition metal solution and a particle growth stage of growing the transition metal hydroxide in a condition in which the pH of the transition metal solution is lower than that at the nucleation stage.

It is also desirable that the source hydroxide producing step is such that the pH of the transition metal solution is from 12 to 13 at the nucleation stage, and that the pH of the aqueous solution is from 11 to less than 12 at the particle growth stage. Thus, with the transition metal hydroxide that serves as the precursor of the positive electrode active material particles 610A, it is possible to obtain particles of the transition metal hydroxide in which the density thereof is higher near the outer surfaces thereof than in the inner portions thereof, so it becomes possible to more stably obtain the positive electrode active material particles 610A each comprise a thin shell portion 612, a wide hollow portion 614, and through-holes 616.

At this time, it is more desirable that the ammonium ion concentration in the transition metal solution at the nucleation stage be less than or equal to 20 g/L, and that the ammonium ion concentration in the transition metal solution at the particle growth stage be less than or equal to 10 g/L. On the other hand, it is desirable that the ammonium ion concentration in the transition metal solution at the nucleation stage and at the particle growth stage be equal to or greater than 3 g/L.

In such a lithium-ion secondary battery 100, the positive electrode active material particles 610A have a characteristic feature. An active material particulate material is used for the positive electrode active material particles 610A. Herein, it is desirable that the active material particulate material comprise, as illustrated in FIG. 13, the shell portion 612 comprising a lithium-transition metal oxide, the hollow portion 614 surrounded by the shell portion 612, and the through-hole(s) 616 penetrating through the shell portion 612. The active material particulate material is such that the proportion of the hollow portion 614 is equal to or greater than 23% of the apparent cross-sectional area of the active material particle 610, and the thickness of the shell portion 612 is less than or equal to 2.2 μm, in average of the active material particles 610 contained in the particulate material. Herein, the thickness of the shell portion 621 at an arbitrary position within an inner surface of the shell portion 612 is defined by the minimum distance from the arbitrary position within the inner surface of the shell portion 612 to an outer surface of the shell portion 612, in an arbitrary cross section of the active material particle 610.

In addition, the thickness of the shell portion may be equal to or greater than 0.05 μm, more preferably equal to or greater than 0.1 μm, in average of the active material particles 610 contained in the particulate material. This improves the durability of the active material particles 610, and therefore serves to stabilize the performance of the lithium-ion secondary battery 100.

As described previously, it is desirable that the lithium-transition metal oxide be a layered compound containing nickel as its constituent element. Moreover, the lithium-transition metal oxide may be a layered compound containing nickel, cobalt, and manganese as its constituent elements. The lithium-transition metal oxide may be a layered compound contained as $Li_{1+x}Ni_yCo_zMn_{(1-y-z)}M_\gamma O_2$. In the formula, 0≤x≤0.2, 0.1<y<0.9, 0.1<z<0.4, and M is an additive. Furthermore, M may be at least one additive selected from the group consisting of Zr, W, Mg, Ca, Na, Fe, Cr, Zn, Si, Sn, Al, B, and F.

As for such an additive, it is especially preferable that tungsten be added to the positive electrode active material particles 610A, in order to obtain the positive electrode active material particles 610A in which the major axis length L1 of the primary particles 800 is less than or equal to about 0.8 μm. For example, with the layered lithium-transition metal oxide such as described above containing nickel, cobalt, and manganese as its constituent elements, it is desirable that tungsten be added in an amount of 0.05 mol % to 2.0 mol % relative to the transition metals. It is desirable that the amount of tungsten added should be, for example, equal to or greater than 0.1 mol %, more preferably equal to or greater than 0.2 mol % relative to the amount of the transition metals. On the other hand, the amount of tungsten added may be, for example, less than or equal to 1.5 mol %, or less than or equal to 1.0 mol %. This makes it easy to control the major axis length L1 of the primary particles 800 of the positive electrode active material particles 610A.

<<Manufacturing Method of Active Material Particles 610>>

A method of manufacturing active material particles 610 comprises: a source hydroxide producing step of supplying ammonium ions to an aqueous solution of a transition metal compound to precipitate particles of a transition metal hydroxide from the aqueous solution; a mixing steps of mixing the transition metal hydroxide with a lithium compound to prepare an unsintered mixture; and a step of sintering the mixture to obtain active material particles 610. Here, the aqueous solution contains at least one transition metal element that constitutes the lithium-transition metal oxide.

It is desirable that the source hydroxide producing step include a nucleation stage of precipitating a transition metal hydroxide from the aqueous solution and a particle growth stage of growing the transition metal hydroxide in a condition in which the pH of the aqueous solution is lower than that at the nucleation stage. This makes it possible to obtain active material particles 610 each having a thin shell portion 612, a wide hollow portion 614, and through-holes 616 efficiently and stably.

In this case, in the mixing step, for example, the unsintered mixture may be allowed to contain tungsten in an amount of from 0.05 mol % to 2.0 mol % relative to the amount of other transition metal(s), and in the step of sintering, the mixture may be sintered at a sintering temperature of from 750° C. to 950° C. in an air atmosphere, whereby the major axis length L1 of primary particles can be adjusted to be $L1 \leq 0.8$ μm. In this case, it is particularly preferable that the lithium compound used in the mixing step be lithium carbonate.

<<Another Manufacturing Method of Active Material Particles 610>>

As another method of manufacturing active material particles 610, it is possible that in the source hydroxide producing step, an aqueous solution of a transition metal compound containing tungsten may be produced, and a transition metal hydroxide containing tungsten may be obtained in the form of particles of the transition metal hydroxide. In this case, it is also preferable that the transition metal hydroxide be allowed to contain tungsten in an amount of from 0.05 mol % to 2.0 mol % relative to the amount of other transition metal(s). In addition, in the step of sintering, the mixture can be sintered at a sintering temperature of from 750° C. to 950° C. in an air atmosphere, whereby the major axis length L1 of primary particles can be adjusted to be $L1 \leq 0.8$ μm.

For example, it is possible that, in the source hydroxide producing step, an aqueous solution $Aq_A$ containing at least one element of Ni, Co, and Mn may be prepared, an aqueous solution $Aq_C$ containing tungsten be may prepared, and the aqueous solution $Aq_A$ and the aqueous solution $Aq_C$ that have been prepared here may be mixed under an alkaline condition, to produce the aqueous solution of a transition metal compound containing tungsten. Thus, with such a layered lithium-transition metal oxide containing nickel, cobalt, and manganese as its constituent elements, tungsten can be added stably, and the major axis length L1 of primary particles can be easily adjusted to be $L1 \leq 0.8$ μm.

It is sufficient here that the positive electrode active material particles such as follows can be obtained in a stable manner the positive electrode active material particles each comprise a shell portion comprising primary particles of a layered lithium-transition metal oxide, a hollow portion formed inside the shell portion, and a through-hole or through-holes penetrating through the shell portion, and the primary particles of the lithium-transition metal oxide have a major axis length of less than or equal to 0.8 μm. For this reason, the method of manufacturing method the positive electrode active material particles is not limited to the above-described method of manufacturing active material particles.

Hereinabove, a lithium-ion secondary battery, a particulate material of active material particles, and a method of manufacturing active material particles according to one preferred embodiment of the invention have been described. However, the present invention is not limited to any of the embodiments described above.

Figure 18:
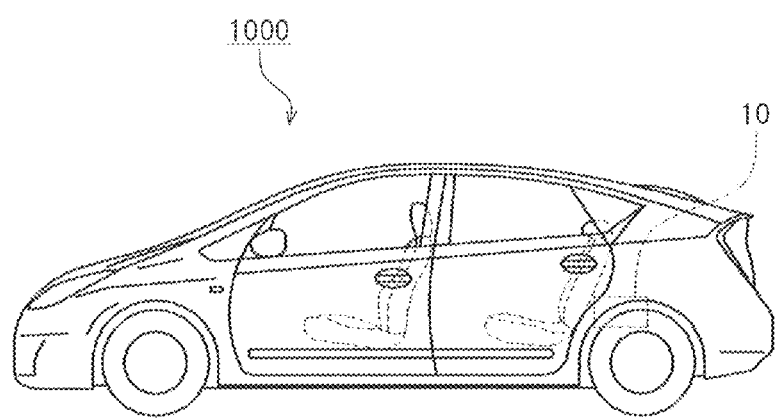
FIG. 18 is a view illustrating a vehicle incorporating a secondary battery.

As described above, the present invention contributes to improvements in the output power characteristics of lithium-ion secondary batteries. Therefore, the lithium-ion secondary battery according to the present invention is suitable for secondary batteries for vehicle-driving power sources that require high capacity and high power, such as batteries for driving hybrid vehicles, which require high levels of cycle performance and output power characteristics at high rate, and further, batteries for driving plug-in hybrid vehicles and electric vehicles, which require a particularly high level of capacity. In this case, as illustrated in FIG. 18, for example, the present invention can be suitably utilized in the form of a battery module, in which a plurality of secondary batteries are connected and combined, for a vehicle drive battery 1000 for driving a motor (electric motor) of a vehicle 1 such as an automobile. In particular, the lithium-ion secondary battery according to the present invention can produce high power stably even at a low charge level, so it can withstand the use at a lower charge level. Therefore, the battery can be used efficiently, and at the same time, even when a high level of capacity is demanded, the number of required batteries can be reduced, resulting in a low cost. Moreover, the lithium-ion secondary battery according to the present invention can produce high power even in a low-temperature environment. Thus, the lithium-ion secondary battery 100 according to the present invention is especially suitable as a vehicle drive battery 1000.

REFERENCE SIGNS LIST

1—Vehicle
100, 100A—Lithium-ion secondary battery
200, 200A—Wound electrode assembly
220, 220A—Positive electrode sheet
221, 221A—Positive electrode current collector
222, 242A—Uncoated portion
223, 223A—Positive electrode active material layer
225—Gap (void)
240—Negative electrode sheet
241—Negative electrode current collector
242—Uncoated portion
243—Negative electrode active material layer
245—Gap (void)
262, 264—Separator
280—Electrolyte solution
290—Charger
300—Battery case
310, 312—Gap
320—Case main body
322—Joint portion between lid and case main body
340—Lid
350—Filling port
352—Sealing cap
360—Safety vent
420, 440—Electrode terminal 610, 610A—Positive electrode active material particle (active material particle)
612—Shell portion
612a—Inner surface of shell portion
614—Hollow portion
616—Through-hole
620, 620A—Conductive agent
630, 630A—Binder
710—Negative electrode active material
730—Binder
1000—Vehicle drive battery
WL—Winding axis

The invention claimed is:

1. A lithium-ion secondary battery comprising:
a current collector; and
a positive electrode active material layer retained on the current collector,
the positive electrode active material layer including:
positive electrode active material particles;
a conductive agent; and
a binder,
the positive electrode active material particles each comprising:
a shell portion comprising primary particles of a layered lithium-transition metal oxide;
a hollow portion formed inside the shell portion; and
a through-hole penetrating through the shell portion, wherein
the primary particles of the layered lithium-transition metal oxide have a major axis length of less than or equal to 0.8 µm in average of the positive electrode active material layer, and
the proportion of the hollow portion is equal to or greater than 23% in average of an apparent cross-sectional area of the positive electrode active material particle in the positive electrode active material layer.

2. The lithium-ion secondary battery according to claim 1, wherein the primary particles of the layered lithium-transition metal oxide have a major axis length of equal to or greater than 0.2 µm.

3. The lithium-ion secondary battery according to claim 1, wherein the through-hole has an aperture width of from 0.01 µm to 2.0 µm in average of the positive electrode active material layer.

4. The lithium-ion secondary battery according to claim 1, wherein when the thickness of the shell portion at an arbitrary position within an inner surface of the shell portion is defined by the minimum distance from the arbitrary position within the inner surface of the shell portion to an outer surface of the shell portion in an arbitrary cross section of the positive electrode active material layer, the thickness of the shell portion is less than or equal to 2.2 µm in average of the positive electrode active material layer.

5. The lithium-ion secondary battery according to claim 4, wherein the thickness of the shell portion is equal to or greater than 0.1 µm.

6. The lithium-ion secondary battery according to claim 1, wherein the layered lithium-transition metal oxide contains at least nickel, cobalt, and manganese as its constituent elements.

7. The lithium-ion secondary battery according to claim 1, wherein the layered lithium-transition metal oxide additionally contains tungsten.

8. The lithium-ion secondary battery according to claim 7, wherein tungsten is contained in the layered lithium-transition metal oxide in an amount of from 0.05 mol % to 2.0 mol % relative to the amount of the transition metals.

9. The lithium-ion secondary battery according to claim 1, wherein:
the positive electrode active material particles are manufactured by a method comprising the steps of:
mixing a lithium compound and a transition metal hydroxide containing at least one transition metal element constituting the layered lithium-transition metal oxide, to prepare an unsintered mixture; and
sintering the mixture to obtain the active material particles.

10. The lithium-ion secondary battery according to claim 9, wherein, in the step of mixing, the unsintered mixture contains tungsten in an amount of from 0.05 mol % to 2.0 mol % relative to the amount of other transition metal(s).

11. The lithium-ion secondary battery according to claim 9, wherein the lithium compound is lithium carbonate.

12. The lithium-ion secondary battery according to claim 9, wherein the step of sintering is performed at a sintering temperature of from 750° C. to 950° C. in an air atmosphere.

13. A positive electrode active material particulate material, comprising:
positive electrode active material particles each comprising:
a shell portion comprising primary particles of a layered lithium-transition metal oxide;
a hollow portion formed inside the shell portion; and
a through-hole penetrating through the shell portion, wherein
the primary particles of the layered lithium-transition metal oxide have a major axis length of less than or equal to 0.8 µm in average of the positive electrode active material particulate material, and
the proportion of the hollow portion is equal to or greater than 23% in average of an apparent cross-sectional area of the positive electrode active material particle.

* * * * *